Fig. 9.

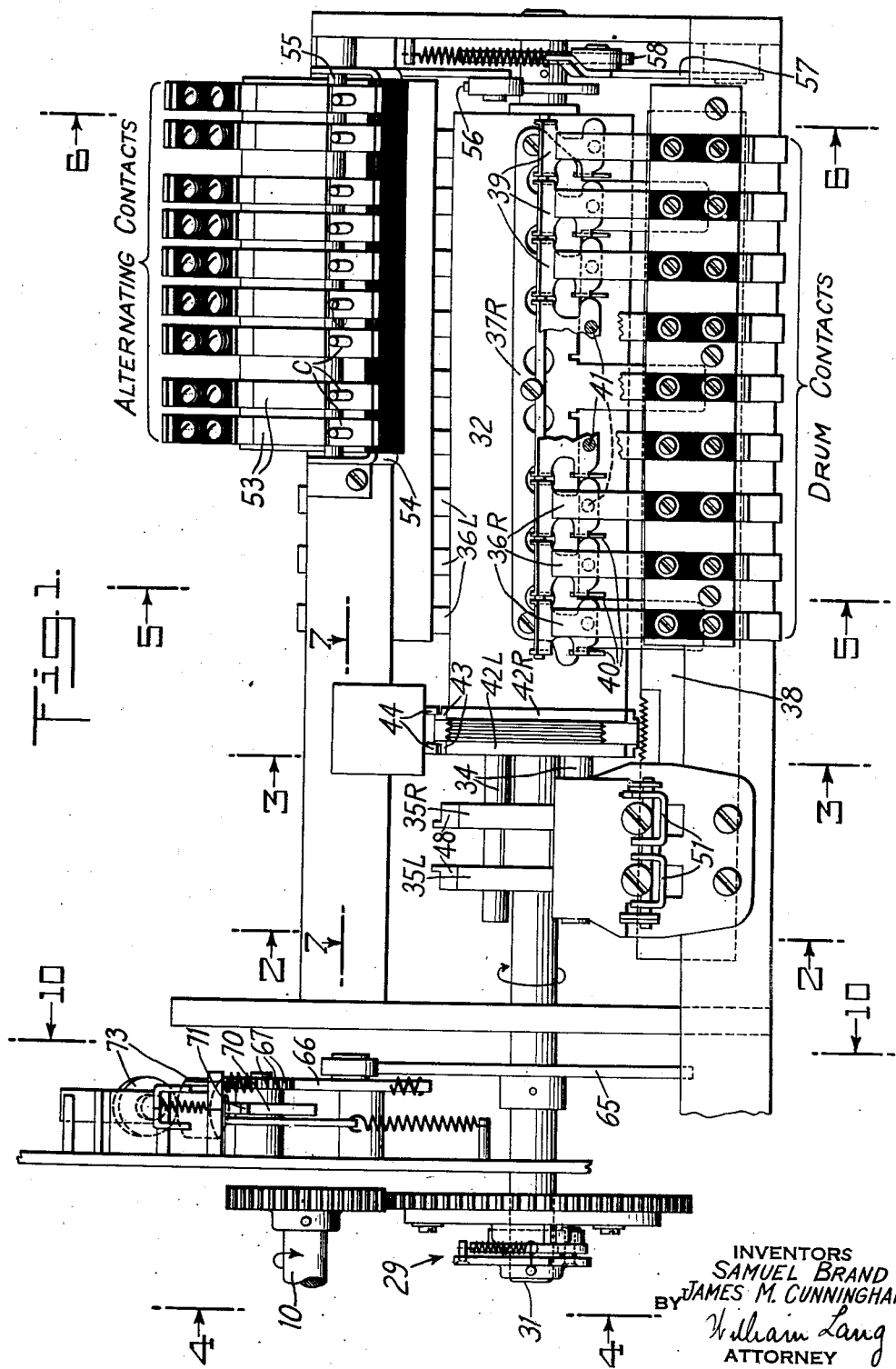

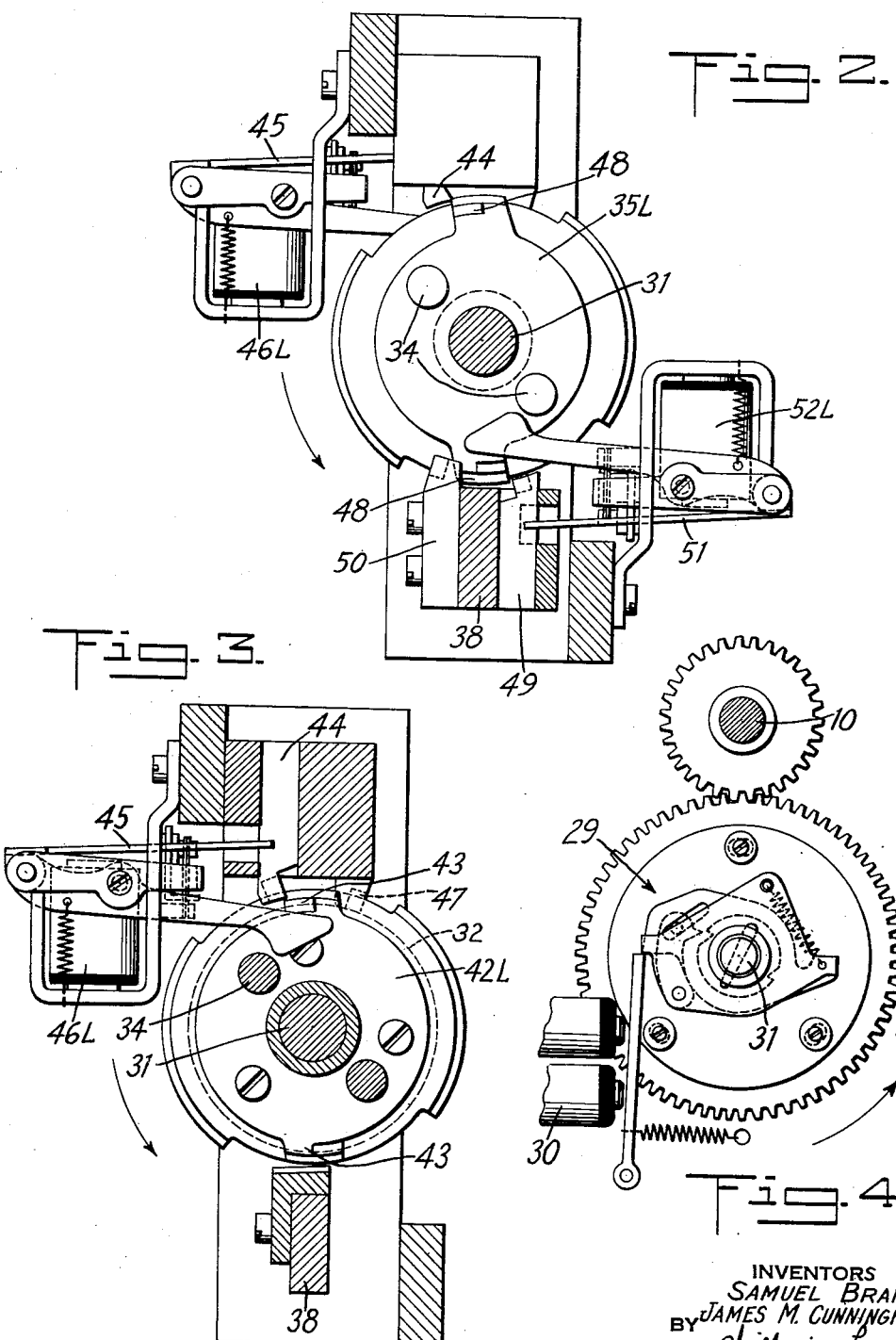

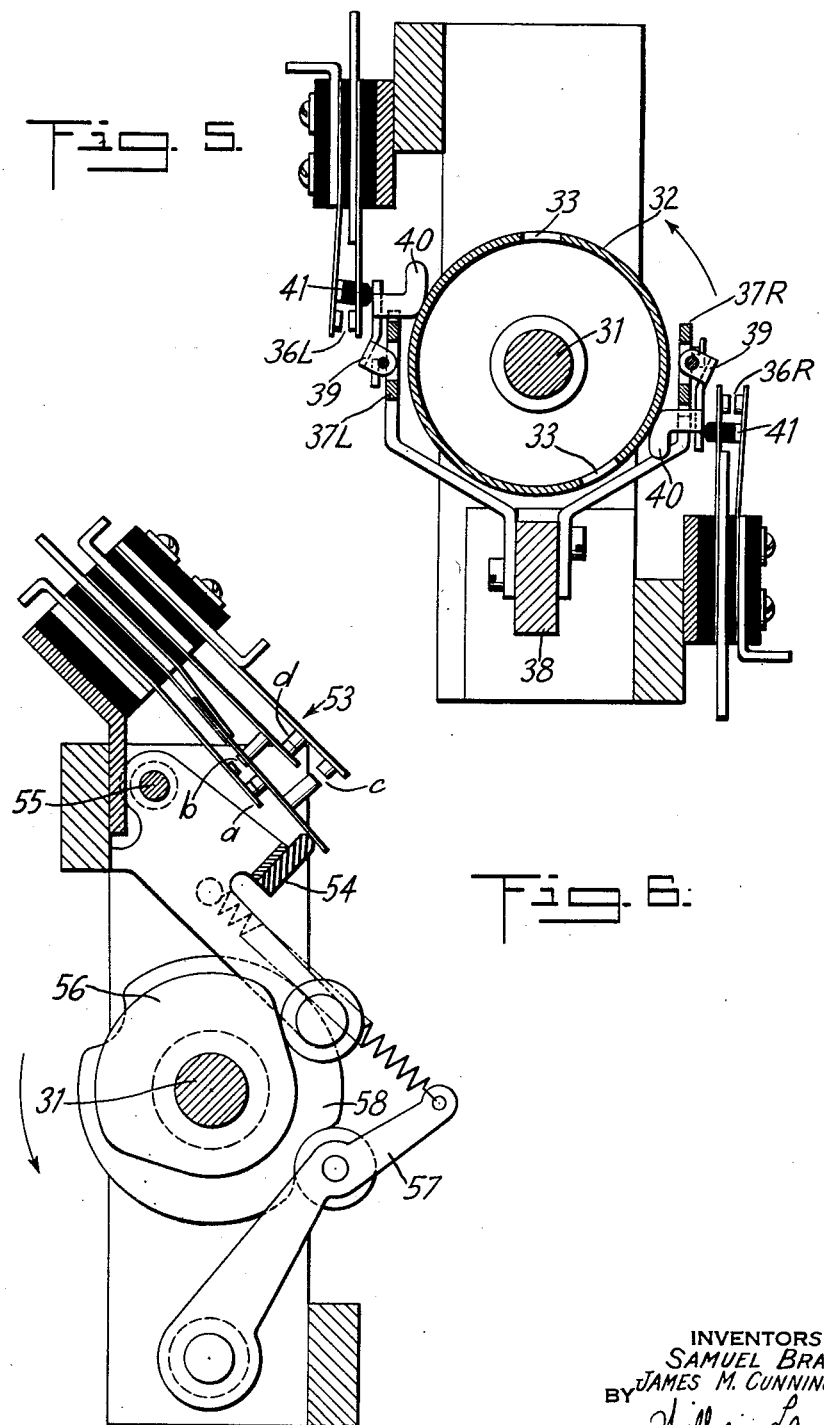

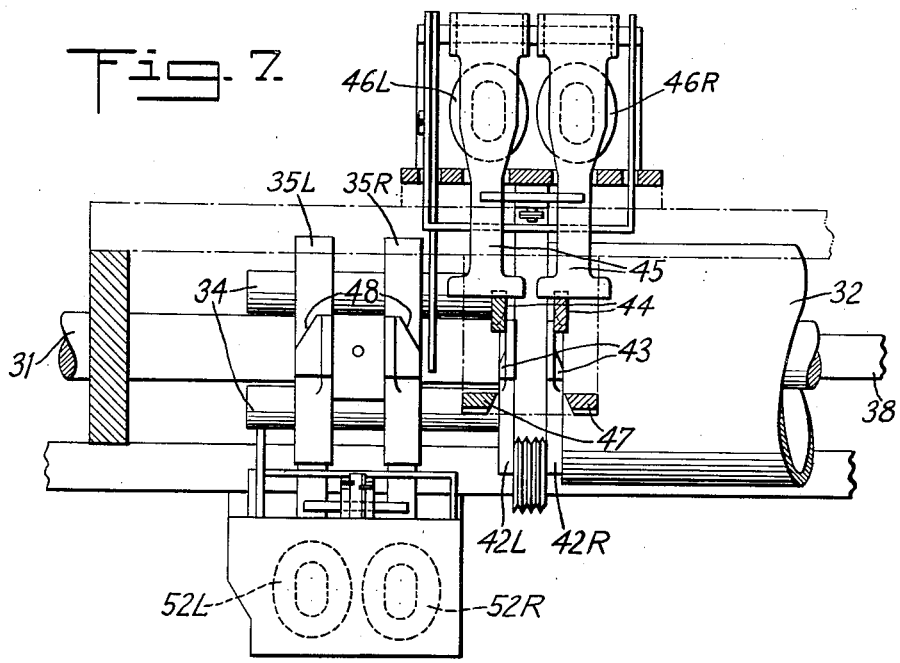
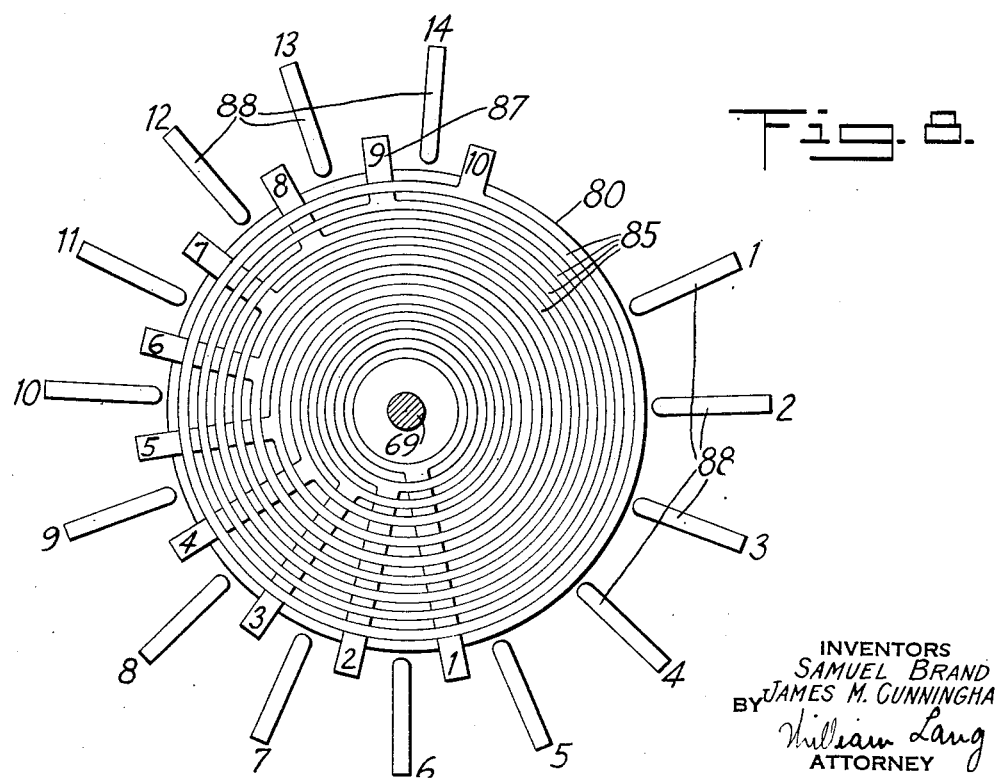

$$892 \div 12 = 74.33$$
$$= 74. \text{ (to 2 Places, rounded)}$$

|  | DIVIDEND ACC | QUOTIENT ACC |  |
|---|---|---|---|
|  | 8 9 2 |  |  |
| 1/2 DIVISOR + | 6 |  |  |
|  | 8 9 8 |  |  |
| − | 8 4 | + 7 | SELECT R7 |
|  | 5 8 |  |  |
| − | 4 8 | + 4 | SELECT R4 |
|  | 1 0 | 7 4 |  |
|  |  |  | SELECT R8 |

Fig. 9a.

$$906 \div 12 = 75.5$$
$$76. \text{ (to 2 Places, rounded)}$$

|  | DIVIDEND ACC | QUOTIENT ACC |  |
|---|---|---|---|
|  | 9 0 6 |  |  |
| 1/2 DIVISOR + | 6 |  |  |
|  | 9 1 2 |  |  |
| − | 8 4 | + 7 | SELECT R7 |
|  | 7 2 |  |  |
| − | 6 0 | + 5 | SELECT R5 |
|  | 1 2 | 7 5 |  |
| − | 1 2 | + 1 | SELECT R9 |
|  | 0 0 | 7 6 |  |

INVENTORS
SAMUEL BRAND
BY JAMES M. CUNNINGHAM
William Lang
ATTORNEY

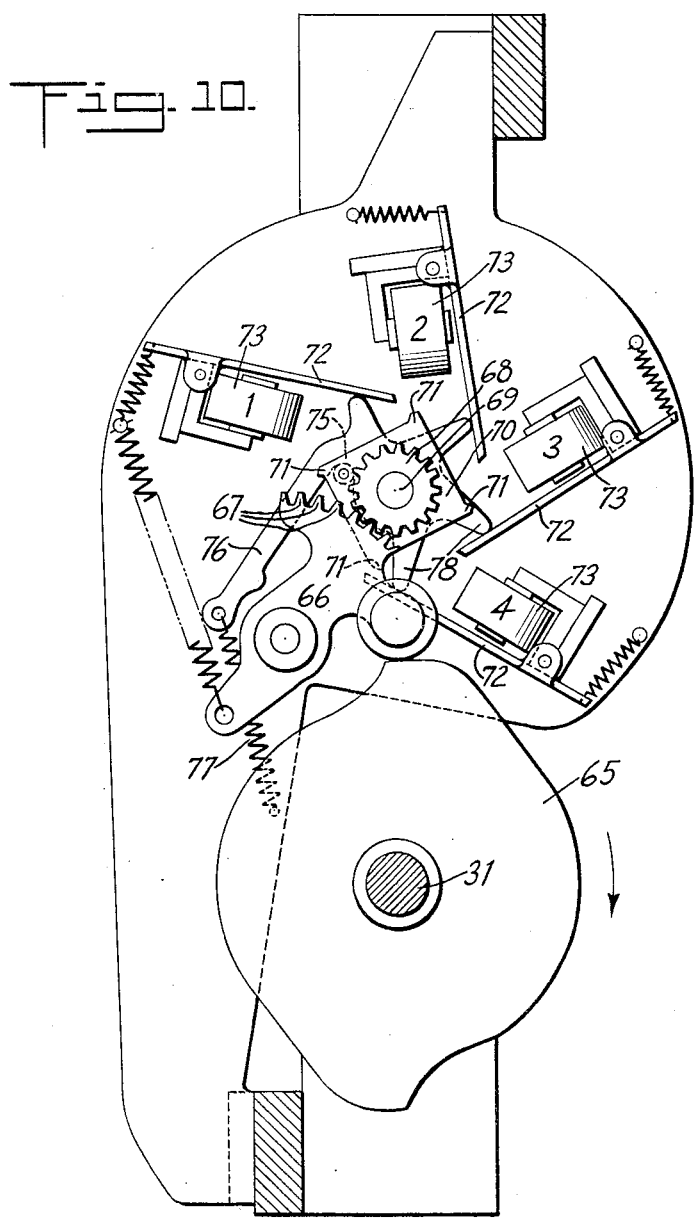

INVENTORS
SAMUEL BRAND
JAMES M. CUNNINGHAM
BY William Lang
ATTORNEY

Jan. 2, 1951   S. BRAND ET AL   2,536,906
RECORD CONTROLLED DIVIDING MACHINE
Filed June 21, 1947   28 Sheets-Sheet 8

Fig. 13.

5314270 ÷ 2743 = 1937.3
1940. to 3 Places rounded

| | DIVIDEND ACC | | QUOTIENT ACC | DIVISOR ACC |
|---|---|---|---|---|
| | | | | 9999997256 |
| (Enter Dd.& Dr.Comp) Add ½ Dr. | 9999999999994685729 9999999999999986284 1 | | 999999999 | CYCLE 3 |
| | 9999999999994672014 | LH | | CYCLE 5 |
| Subt. 2 X Dr. (53÷27) | 0100--- 4486--- 1 | RH | 9999997999 Add 2 1 | CYCLE 6 |
| | 9999999999995672014 | | 9999997999 | |
| Add. 1 X Dr. (Overdraft Correction) | 0000000000000158015 9999999999997256999 | | 1---Subt.1 9999998999 | CYCLE 7 |
| Subt. 8 X Dr. (25÷27) | 9999999999997415014 1532--- 6624--- | LH RH | 9999999199 Add 8 1 | CYCLE 9 |
| | 9999999999998947014 | | 9999999199 | CYCLE 10 |
| Subt. 1 X Dr. (Underdraft Correction) | 9999999999999604414 2743--- | | 9999998199 Add 1 1 | CYCLE 12 |
| | 9999999999999883714 0211---- 8862--- | LH | 9999998099 | CYCLE 14 |
| Subt. 4 X Dr. (11÷27) | 9999999999999904814 | RH | 9999999959 Add 4 1 | CYCLE 15 |
| | 9999999999999993434 | | 9999998059 | |

INVENTORS
SAMUEL BRAND
JAMES M. CUNNINGHAM
BY William Lang
ATTORNEY

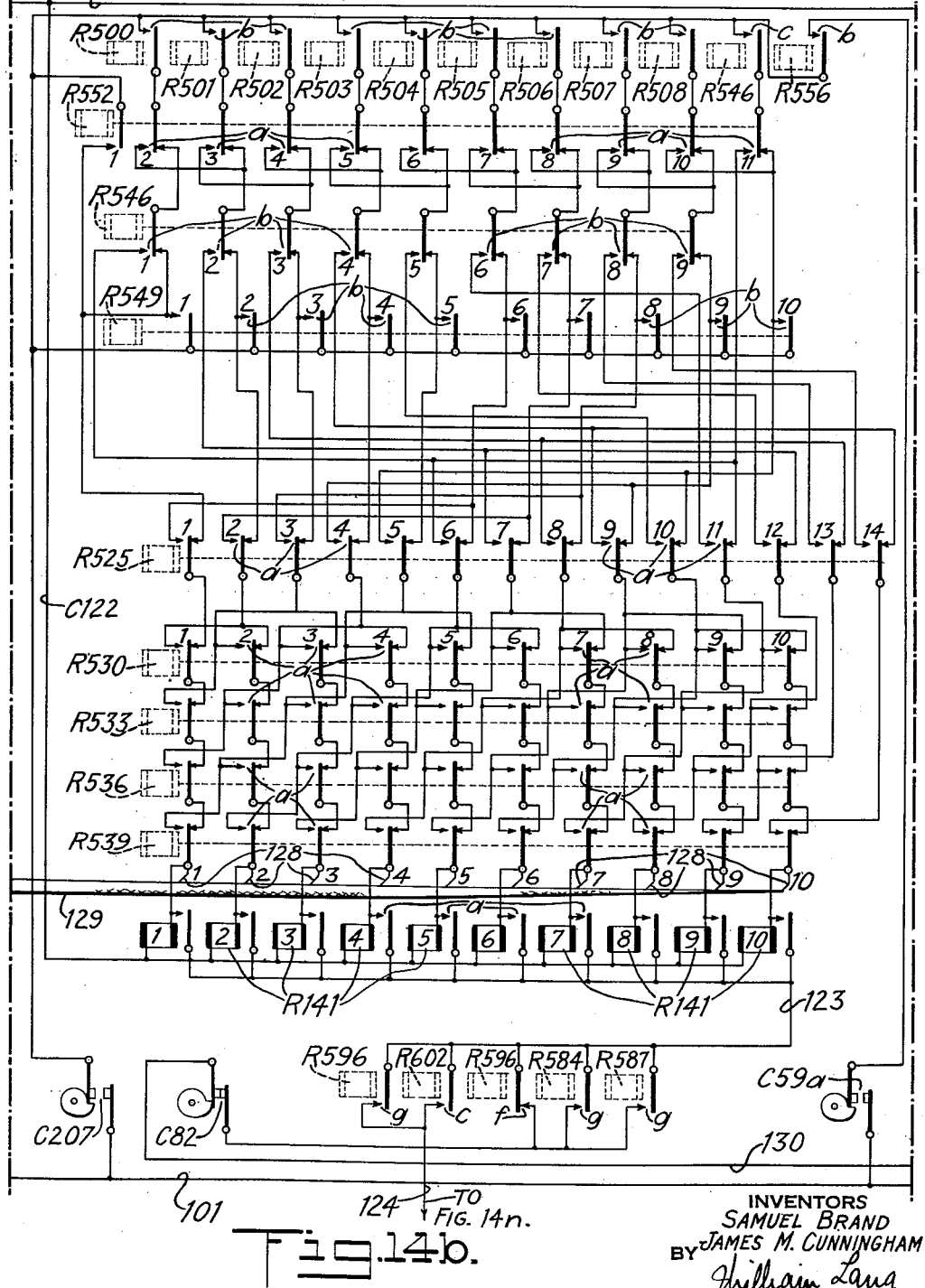

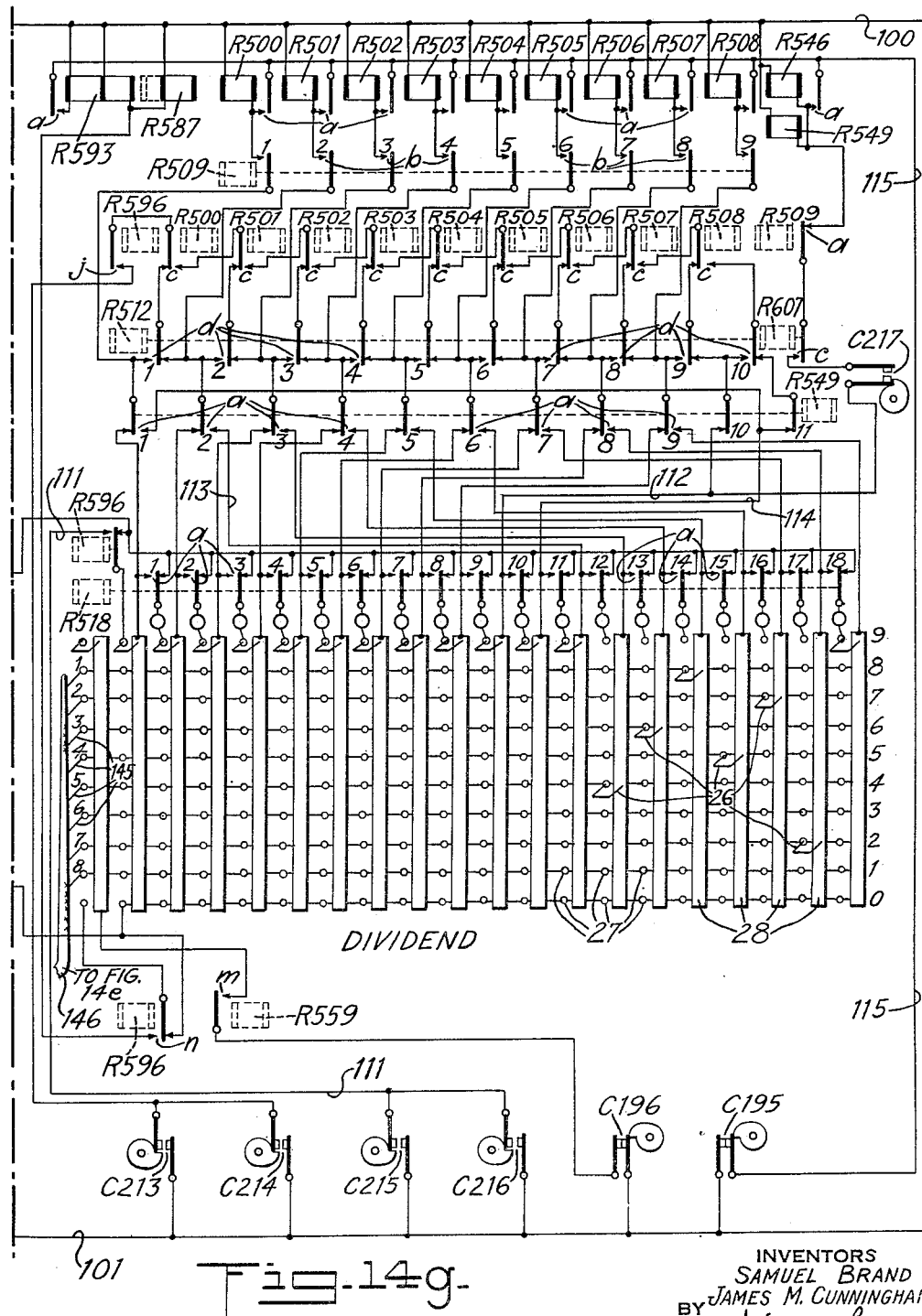

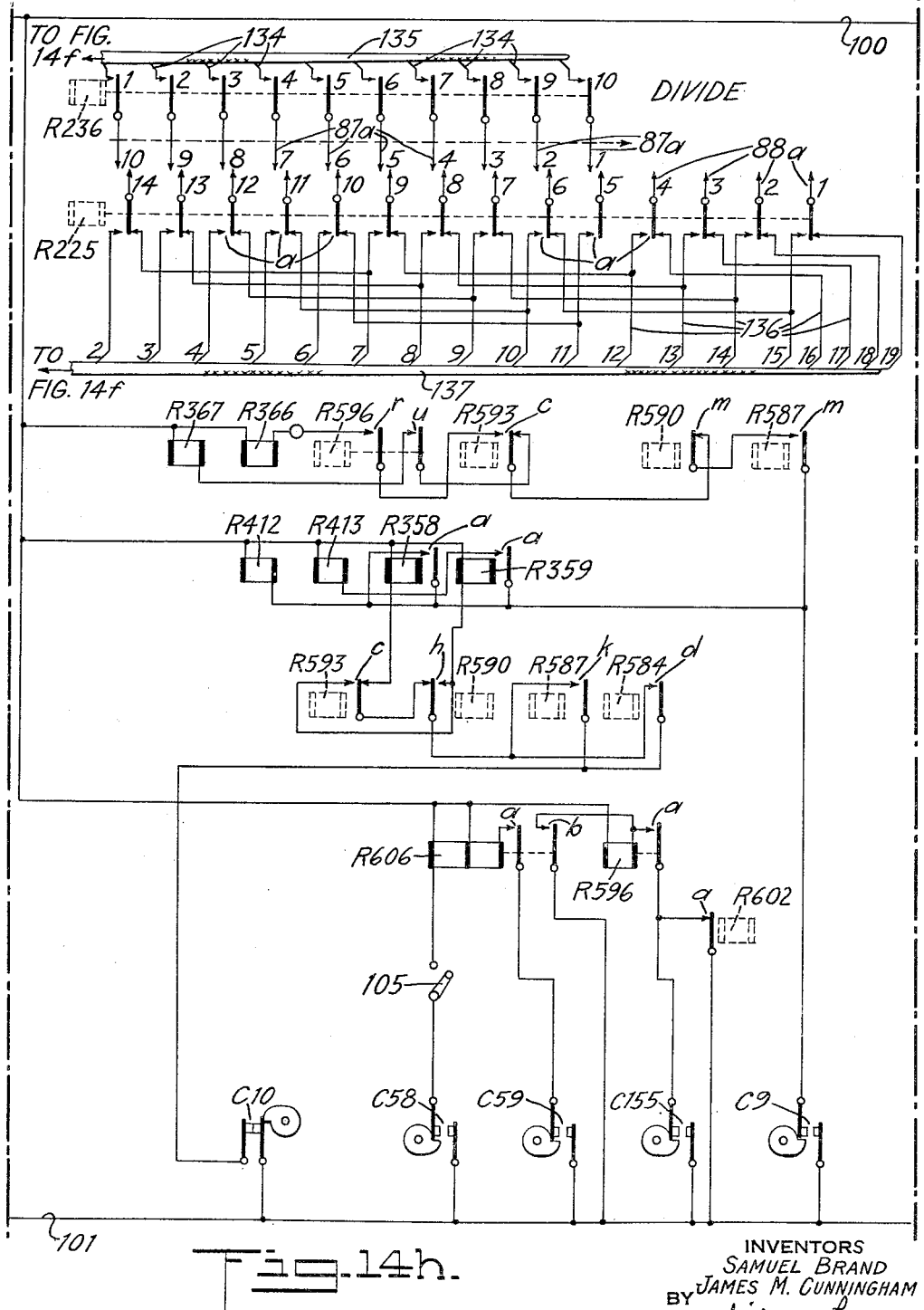

Jan. 2, 1951 S. BRAND ET AL 2,536,906
RECORD CONTROLLED DIVIDING MACHINE
Filed June 21, 1947 28 Sheets-Sheet 20

INVENTORS
SAMUEL BRAND
JAMES M. CUNNINGHAM
BY
ATTORNEY

Jan. 2, 1951   S. BRAND ET AL   2,536,906
RECORD CONTROLLED DIVIDING MACHINE
Filed June 21, 1947   28 Sheets-Sheet 26

INVENTORS
SAMUEL BRAND
BY JAMES M. CUNNINGHAM
William Lang
ATTORNEY

Jan. 2, 1951     S. BRAND ET AL     2,536,906
RECORD CONTROLLED DIVIDING MACHINE
Filed June 21, 1947     28 Sheets-Sheet 27

Patented Jan. 2, 1951

2,536,906

UNITED STATES PATENT OFFICE 2,536,906

RECORD CONTROLLED DIVIDING MACHINE

Samuel Brand, Binghamton, and James M. Cunningham, Endicott, N. Y., assignors to International Business Machines Corporation, New York, N. Y., a corporation of New York Application June 21, 1947, Serial No. 756,246

18 Claims. (Cl. 235—61.7)

This invention relates to calculating machines and more particularly to machines in which dividing operations are performed.

The principal object of the invention is to provide improved mechanism for carrying out division. In general, and following the procedure involved in manual division, the machine determines one quotient digit at a time, multiplies the divisor by it, and reduces the dividend by the resulting product. This operation is repeated until the calculation is completed for a predetermined number of quotient positions or for the capacity of the quotient receiving device.

In making the determination of quotient digits, a novel selecting device is employed wherein only the two highest significant places of both the dividend and the divisor are considered and from these a trial quotient digit is obtained, which in all cases is correct or one unit too high or too low. In any case, multiplication proceeds with the selected trial digit, followed by reduction of the dividend by the product so obtained. If the selected digit had been a unit too high, correction is effected by adding 1 times the divisor to the dividend remainder and also reducing the quotient digit by 1. If the digit had been a unit too low, correction is effected by suppressing column shift and selecting the quotient digit 1 to cause reduction of the dividend remainder by 1 times the divisor and adding 1 to the trial quotient digit, bringing it up to the proper value.

Accordingly, it is an object of the invention to provide a novel quotient digit selecting device responsive to the two highest divisor digits and the two highest digits of the dividend and subsequent dividend remainders, to select a quotient digit in each case or at each stage in the operation that will be the correct one for the problem or that may be high or low by one unit. When the value of the dividend digits is greater than the value of the divisor digits, a so-called whole number quotient digit is selected and, where the value of the dividend digits is less than the value of the divisor digits, a so-called "tenths" quotient digit is selected, i. e. the digit selected will represent the quotient of the divisor pair of digits and 10 times the dividend pair within one unit. Where the divisor has but a single digit, the selection is made as for 10 times such digit and column shift devices effect a compensating denominational allocation of the subsequent product entry into the dividend accumulator.

A further object of the invention is to provide novel rounding off devices where the dividend is not exactly divisible by the divisor to a predetermined number of quotient places. Instead of, as heretofore, calculating the result with one extra position and then adding a 5 for correction, ½ the divisor is initially added to the dividend in columnar relationship depending upon the number of places to be calculated in the quotient. The following problems illustrate the manual method and the method employed in the present invention and show that with the present system the calculation of an extra quotient position is not required.

MANUAL CALCULATION

```
                    2. 9    quotient
       divisor  18)53.      dividend
                   36
                   ---
                   170
                   162
                   ---
                     8
```

```
quotient           2. 9
½ correction      +. 5
                  ----
adjusted quotient  3.
```

PRESENT METHOD

*For a 1 place quotient*

```
dividend             53
½ divisor (18)     + 9
                    ---
adjusted dividend    62
```

```
                    3.    quotient
       divisor  18) 62    adjusted dividend
                    54
                    --
                     8
```

PRESENT METHOD

*For a quotient rounded to 4 places*

```
dividend          530406
½ divisor (18)    +   9
                  ------
                  530496
```

```
               2947
         18) 530496
             36
             ---
             170
             162
             ---
              84
              72
              ---
              129
              126
```

With the manual method the advisor would have to be carried out to obtain 29467 and a 5 added to the 7 to raise the digit 6 one unit. The present method is of particular value where no extra quotient receiving capacity is available to set up the extra digit and add a 5 thereto.

The columnar position or positions into which ½ the divisor is added is determined by what may be termed a "quotient place limit control" device which varies the entry position automatically as the denominational magnitudes of the factors vary, and in addition controls the termination of dividing operations after any predetermined number of significant digits have been calculated in the quotient regardless of the location of the decimal point.

A still further object is to provide improved devices for determining the location of the decimal point in a calculated quotient. The entry of the dividend into its entry receiving device or accumulator must be made with regard to the extent to which it is to be reduced, and it must be entered sufficiently to the left to provide the necessary decimal positions in the quotient. Therefore, the sum of the decimals in the divisor and in the quotient determines the decimal point in the dividend accumulator.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an outside elevation of the partial product drum and the selecting mechanism.

Fig. 2 is a sectional elevation taken on lines 2—2 of Fig. 1 showing the interposer contact shifting mechanism.

Fig. 3 is a sectional elevation taken on lines 3—3 of Fig. 1 showing the drum shifting mechanism.

Fig. 4 is an end elevation taken on lines 4—4 of Fig. 2, showing the drum clutch operating mechanism.

Fig. 5 is a sectional elevation taken on lines 5—5 of Fig. 1, showing the drum operated interposer contacts.

Fig. 6 is a section elevation taken on lines 6—6 of Fig. 1, showing the alternating contacts and their operating mechanism.

Fig. 7 is a plan elevation looking in the direction of arrows 7—7 of Fig. 1.

Fig. 8 is a diagrammatic showing of certain column shift contacts.

Figs. 9 and 9a are examples illustrating final quotient testing conditions.

Fig. 10 is an elevational view of the column shift positioning mechanism looking in the direction of lines 10—10 of Fig. 1.

Fig. 13 is a diagram showing the mathematical procedure involved in carrying out a problem in division indicating the values standing in the several accumulators at successive stages of operation.

Figs. 14a, 14b, 14c, 14d, 14e, 14f, 14g, 14h, 14i, 14j, 14k, 14m and 14n arranged horizontally in the order named constitute a wiring diagram of the electric circuits of the machine.

Figs. 15a, 15b, 15c and 15d arranged horizontally in the order named constitute a sequence diagram of the various relay magnets to show their periods of energization through a series of cycles involving the solution of a selected problem in division.

Figure 16:
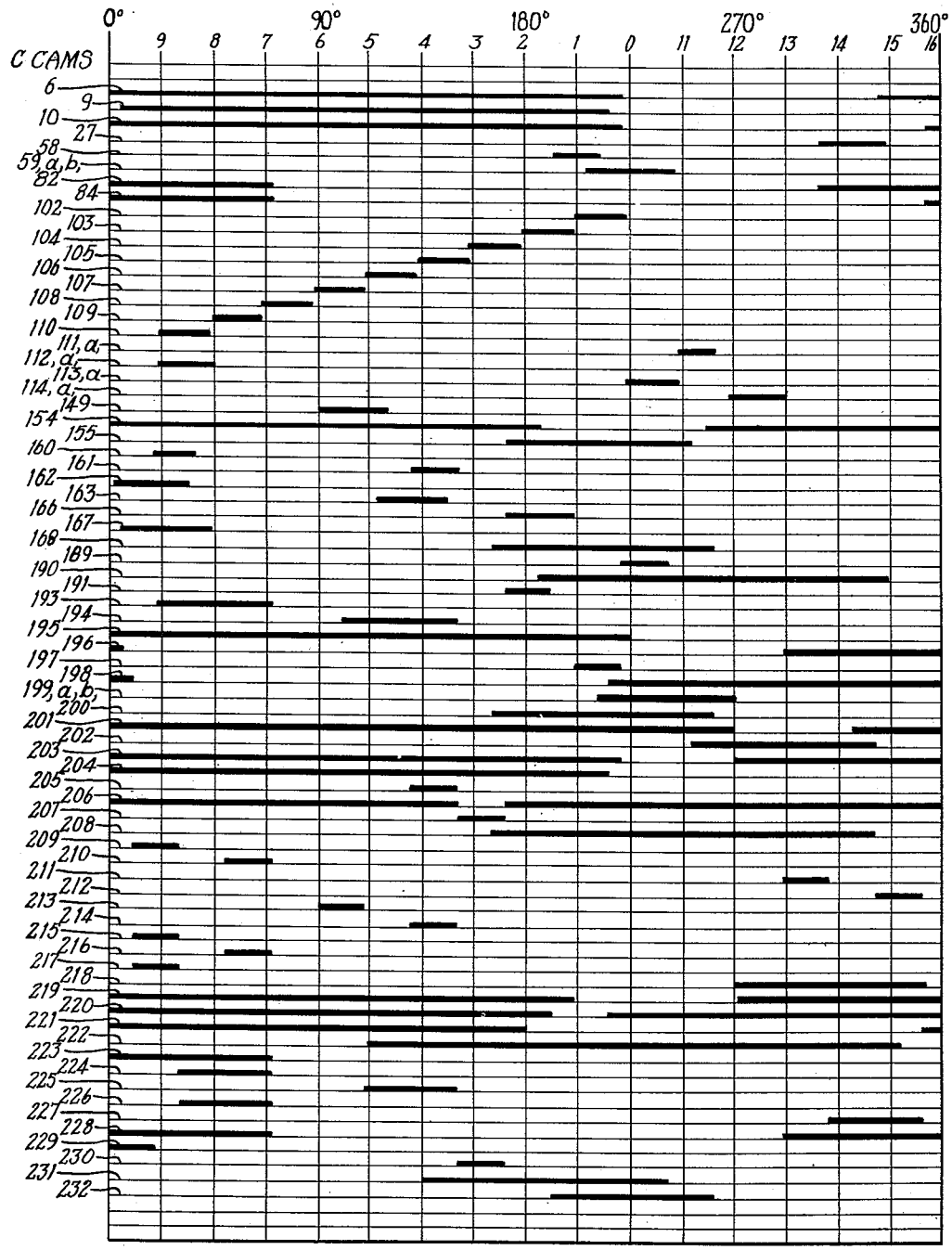

Fig. 16 is a timing chart of the several cam controlled contact devices of the machine.

Figure 17:
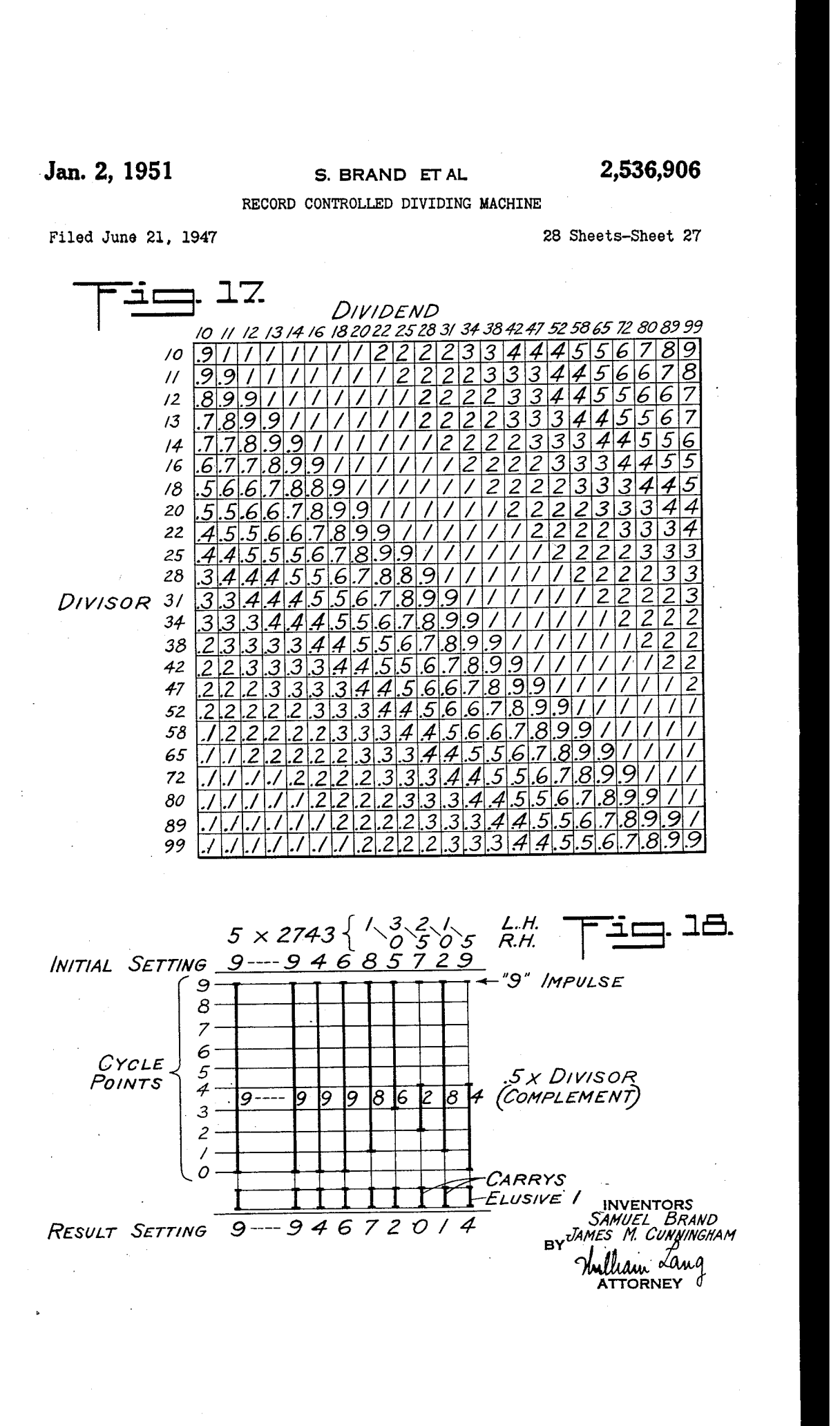

Fig. 17 is a chart showing the principles of selection of a trial quotient digit under control of divisor and dividend value pairs.

Fig. 18 is a diagram showing the manner of entering ½ the divisor.

Figure 19:
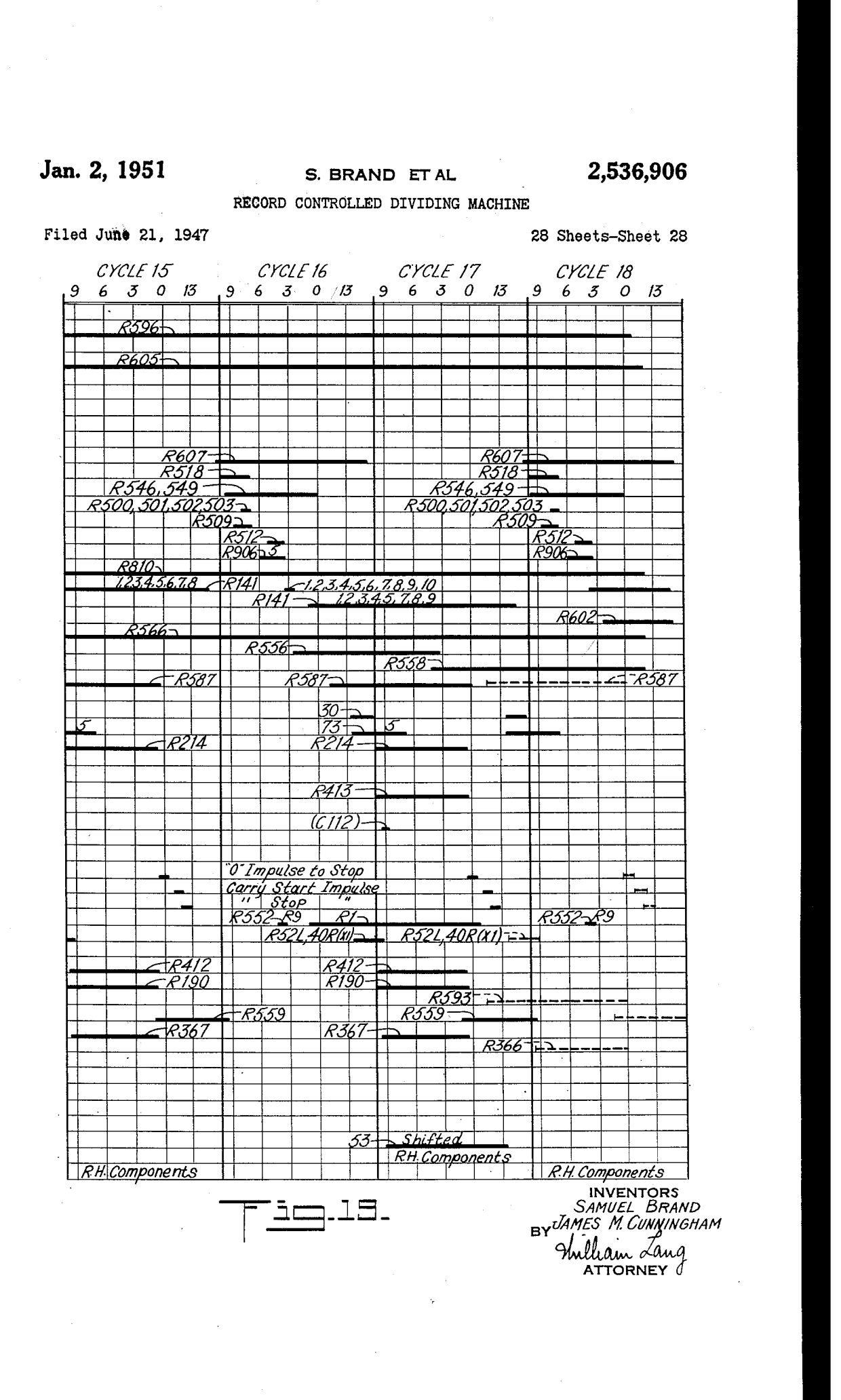

Fig. 19 is a sequence diagram showing the operations involved for a special condition.

The mechanical structure of the accumulating, partial product forming, and column shift mechanism will first be explained, and thereafter the manner in which they are coordinated will be explained in connection with the wiring diagram.

THE ACCUMULATING MECHANISM

Figure 12:
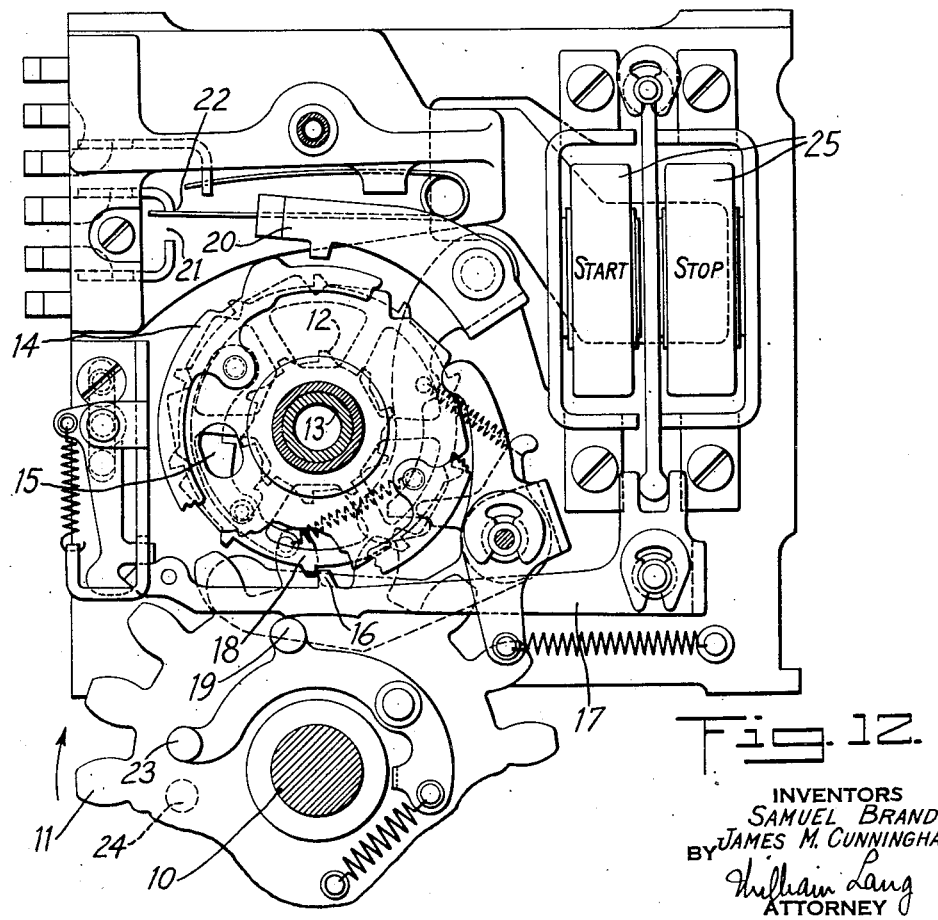
Fig. 12 is a sectional view of one denominational order unit of the accumulating mechanism.

The accumulating mechanism is of the well known type disclosed in the Lake et al. Patent 2,328,653, granted September 7, 1943, and one unit or order thereof is shown in Fig. 12. Its operation briefly is as follows.

A constantly rotating shaft 10 driven from a suitable source of power has secured thereto a gear 11 for each accumulating unit or order. This gear meshes with and drives a gear (not shown) integral with driving ratchet 12 freely rotatable on a stud 13. Also free on stud 13 is an element or wheel 14 to which is pivoted a dog 15 lying in the plane of ratchet 12 and normally held out of engagement therewith. As more fully explained in the patent referred to, this disengagement is maintained through the interception by a tooth 16 on a lever 17 of a disk 18. When lever 17 is rocked counterclockwise, the disk 18 is released and, as a result, dog 15 engages ratchet 12 and is driven thereby together with accumulating element 14. At a fixed point in the cycle (termed the 0 point), a knockout pin 19 rocks lever 17 back into intercepting position and effects uncoupling of the accumulating element. A cycle of operation, represented by a revolution of shaft 10, is divided into sixteen so-called cycle points designated as 0, 9, 8, 7, 6, 5, 4, 3, 2, 1, 0, 11, 12, 13, 14, 15. To enter any significant digit, clutching is effected at the correspondingly numbered cycle point, and later declutching at the 0 cycle point will leave the accumulating element or wheel 14 advanced a corresponding amount. The driving ratio is such that wheel 14 advances a 1/10 of a revolution for each cycle point of engagement and thus has ten rotative positions representative of the ten digits.

When the wheel 14 stands at its rotative position 9, a carry lever 20 rocks to close 9's carry contacts 21 and, when the wheel passes from 9 to 0 position, 10's carry contacts 22 are closed and latched as shown. To effect a carry entry of one unit, lever 17 is rocked counterclockwise after the 0 point in the cycle, and one point later a second knockout pin 23 effects uncoupling. A further pin 24 is timed to release the latched carry lever 20 after this carry period in the cycle.

A magnet 25 designated "Start," when energized, will rock lever 17 counterclockwise to start rotation of the accumulating wheel 14, and a second magnet 25 designated "Stop," when energized, will rock lever 17 in reverse direction to stop rotation of the wheel. This second magnet is employed for subtracting operations wherein the 9's complement of a digit is entered by initially energizing Start magnet 25 at the 9 point in the cycle and thereafter energizing Stop magnet 25 at the cycle point corresponding to the value of the digit whose 9's complement is to be entered.

As usual in this type of accumulator, each wheel 14 has connected thereto a so-called readout brush 26 (shown diagrammatically in the circuit Figs. 14c, 14d, 14e and 14g) which takes any of ten positions with relation to a series of contact segments 27 to effect an electrical connection between the segment and a common conductor 28. In the actual accumulator, the segments 27 and conductor 28 are circularly disposed as is well known but in the circuit they are illustrated in a linear manner for more convenient explanation and circuit tracing.

Figure 14A:
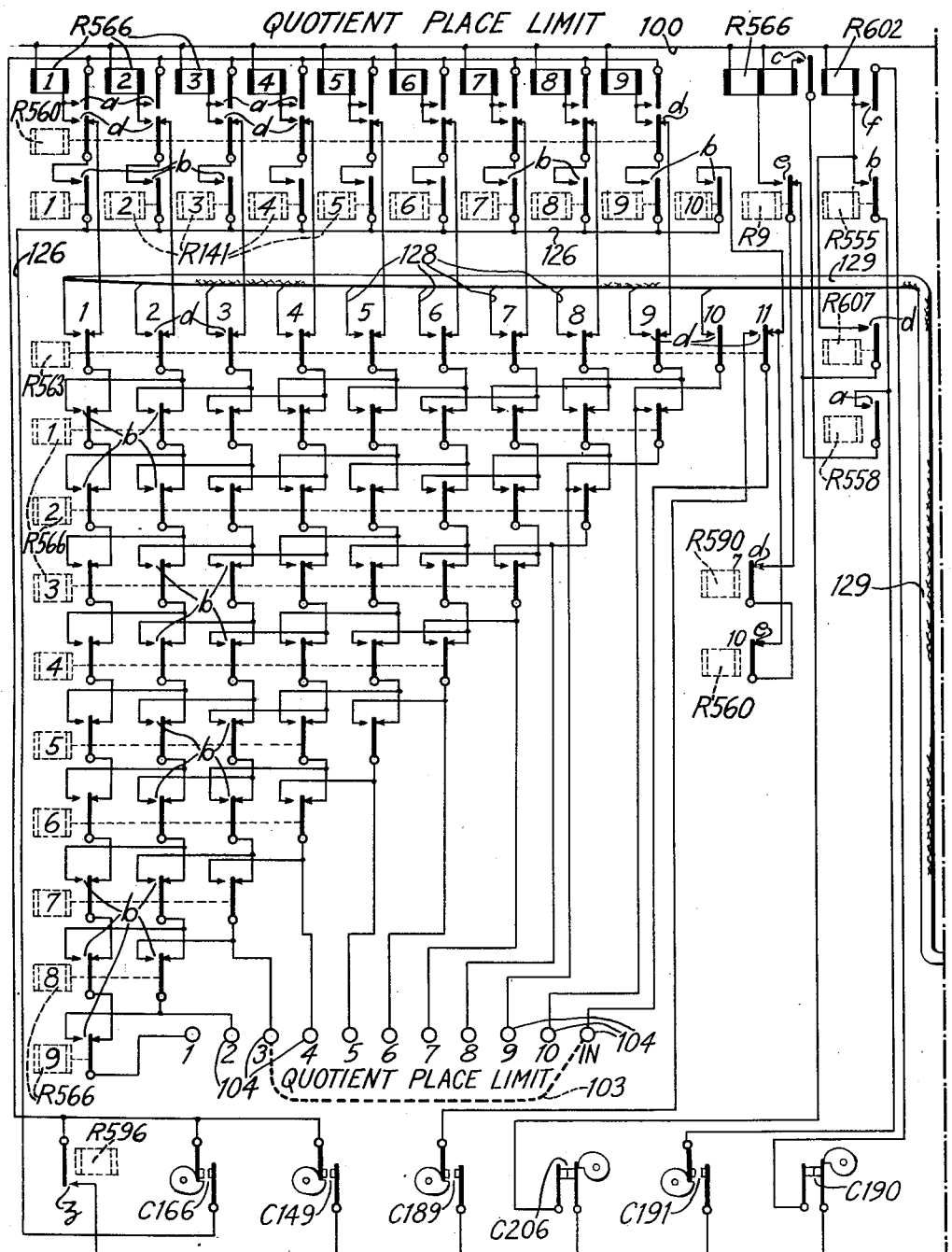
Figure 14C:
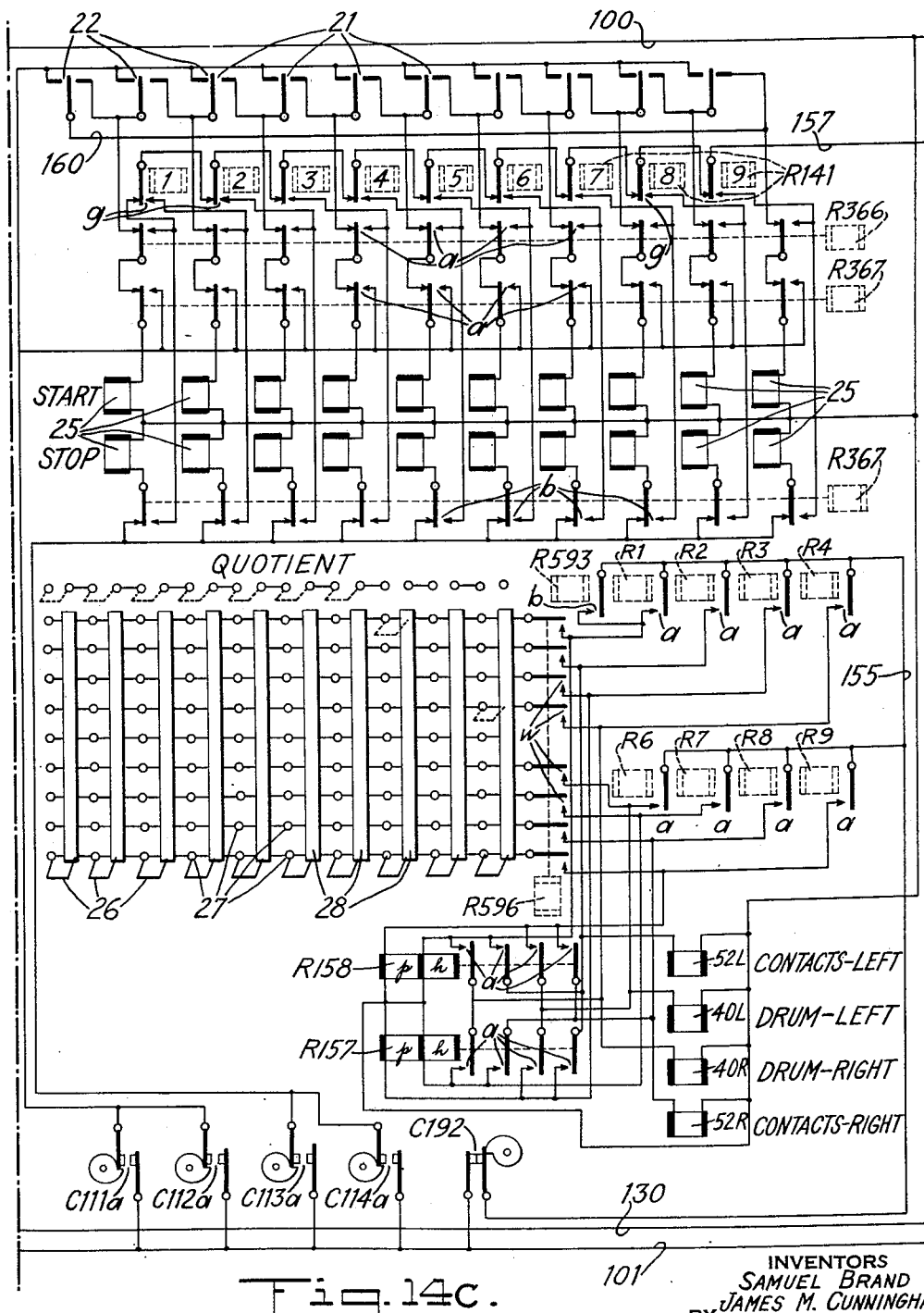

The separate units or orders are grouped to form several accumulators designated as Divisor (Figs. 14c and 14d), Dividend (Fig. 14g) and Quotient (Fig. 14c). Each is provided with readout brushes 26, and in the case of the divisor accumulator a double set of brushes 26, segments 27, and conductors 28 is provided for purposes to be explained in connection with the circuit diagram.

THE PARTIAL PRODUCTS FORMING MECHANISM

This mechanism is shown and described in Brand Patent 2,413,859, granted January 7, 1947, and its operation is as follows. Shaft 10 (Fig. 4) through a well known ½ revolution clutch generally designated 29 is effective upon energization of drum clutch magnet 30 to drive a shaft 31 through a ½ revolution for each revolution of shaft 10. Slidably mounted on the shaft 31 is a multiplying drum or cylinder generally designated 32 (Figs. 1 and 11), in which are openings or perforations 33 arranged in accordance with the multiplication table. One end of the drum has holes therein through which rods 34 extend (Figs. 2 and 7). These rods are affixed in a pair of disks 35L and 35R secured to shaft 31, so that drum 32 rotates with the shaft but is free to slide lengthwise thereon and also slides on rods 34.

Along one side of the drum is located a set of nine pairs of contacts 36R and along the opposite side is located a set of nine pairs of contacts 36L (see Figs. 1 and 5). Located between the drum and each set of contacts is a plate 37L or 37R secured to a rectangular bar 38 mounted in brackets for sliding lengthwise in a direction parallel to shaft 31. Each plate 37L or 37R has secured thereto a rod upon which are pivoted nine interposer levers 39, each with a finger 40 riding on the surface of drum 32. Each finger 40 is urged against the drum by pressure of a related contact spring and, when the plate and interposers are shifted to the left or right as viewed in Fig. 1, the contacting pin 41 (Fig. 5) slides on the interposer and maintains pressure against it. When during the rotation of the drum a perforation 33 in line with finger 40 reaches such finger, the latter will be pressed into the perforation and the related contacts 36L or 36R will close.

Figure 11:
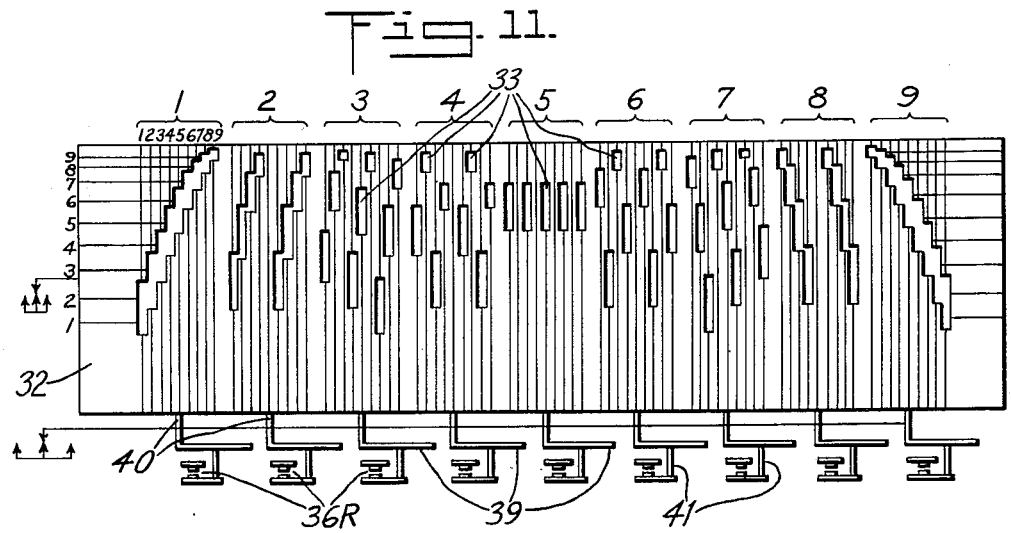
Fig. 11 is a diagram showing the shifting relationship between the drum and interposers.

Before explaining the specific mechanism for shifting the drum 32 and interposer plates 37L and 37R, the principle involved in the selection of controlling perforations on the drum will be explained in connection with the diagram of Fig. 11. In this figure the side of drum 32 containing the right hand partial product digit perforation 33 is shown. The manner of arranging the perforations is well known and, briefly, the perforations are grouped in nine sets, one set for each possible multiplier digit. Each set is divided into nine parallel positions indicated by vertical lines numbered 1 to 9 and the perforations are also spaced on nine horizontal lines numbered 1 to 9. Fingers 40, of which there is one for each set of perforations, normally ride along the 5 vertical line of each set, respectively, so that with the drum 32 and interposers 40 in normal position shown, the parts are set to multiply by the digit 5; that is, as drum 32 now rotates, fingers 40 will drop into perforations representing the right hand digits of 5 times all of the digits 1 to 9.

For example, the left hand finger 40 will drop into the perforation at the intersection of the 5 vertical line and the 5 horizontal line in the 1 set, and close its contacts 36R at such time to represent the digit 5 of the product 1 times 5; the right hand finger 40 will drop into the perforation at the intersection of the 5 vertical line and the 5 horizontal line in the 9 set and close its contacts 36R at such time to represent the 5 of the product 9 times 5; and similarly in the other odd numbered sets the related contacts 36R will close when the perforations on the 5 horizontal line reach the fingers. In the even numbered sets there is no perforation on the 5 horizontal line, since the right hand digit is zero.

To select the other vertical lines, drum 32 may be shifted to the left or right a distance equal to the spacing between adjacent vertical lines as indicated by arrows at the left center of drum 32, and interposers 40 may be shifted to the left or right a distance equal to 3 times the spacing between adjacent vertical lines as also indicated by arrows. The following table will show the combinations of shift for the drum and interposer to position fingers 40 in line with the other vertical lines.

| Drum 32 | Fingers 40 | Select Vertical Line |
|---|---|---|
| shift left | | 6 |
| shift right | | 4 |
| | shift left | 2 |
| | shift right | 8 |
| shift left | shift left | 3 |
| shift left | shift right | 9 |
| shift right | shift left | 1 |
| shift right | shift right | 7 |

Thus, with a maximum movement of one step by the drum and three steps by the interposers (a step being the spacing of the vertical column), selection is effected for any of the multiplier digits, except 5, and for such 5 digit no movement is required. The left hand partial products perforations are also arranged in the same manner in accordance with the left hand components, so that shifting of drum 32 and interposer plate 37L will select the appropriate lines of perforations.

*Shifting the drum.*—Secured to the left end of drum 32 (Fig. 7) are two disks 42L and 42R provided with camming surfaces 43 (see also Fig. 3). With the drum in normal central position along shaft 31, these camming surfaces are in line with interposers 44 under which they normally pass. The lower ends of these interposers are beveled so that, when either is lowered into the path of the related cam 43, the latter will be engaged during its rotation to cam itself and the drum along shaft 31 to the left or right, depending upon which of the two interposers 44 is lowered.

Each interposer 44 is notched to receive the free end of an armature 45, and these armatures are controlled by magnets 46L and 46R.

As viewed in Fig. 3, drum 32 rotates counterclockwise and, just before camming surfaces 43 arrive at interposers 44, the latter may be operated so that, if one or the other is lowered into the path of a camming element 43, the drum will shift itself in one direction or the other. Restoring cam surfaces 47 (Fig. 7) fixedly secured to the framework are located to engage surfaces 43 as the latter pass by, so that the drum is centralized in its normal position as surfaces 43 approach interposers 44.

*Shifting the contact interposer plates.*—Referring to Figs. 2 and 7, disks 35L and 35R are provided with camming surfaces 48 which engage vertically slidable interposers 49 and restoring cams 50 during the rotation of shaft 31. The action is the same as described for the shifting of drum 32, and in the same manner interposers 49 are operated by armatures 51 of a pair of magnets 52L and 52R.

In this case the disks, being secured to shaft 31, remain in their planes of rotation and, when an interposer 49 is elevated, the interposer when engaged by cam 48 will be shifted laterally and will carry with it the sliding bar 38 upon which the contact interposer plates 37L and 37R are secured. The cams 50 are fast to bar 38 so that cam 48 engages them and restores bar 38 if it had been previously shifted.

It will be noted that two sets of diametrically opposite cams 43 and 48 are provided so that drum and interposer plate restoration occurs at 180° intervals and, assuming the parts are relatively shifted in accordance with a first multiplier digit, contacts 36R (Fig. 5) will read the perforations in one-half of drum 32 and contacts 36L will read the perforations in the other half during the first 180°. Thereafter, the parts are restored and reshifted in accordance with the next multiplier digit, and during the second 180° contacts 36L will read the perforations in the first half of the drum and contacts 36R will read the perforations in the second half. There is thus an alternation in the operation of the two sets of contacts 36L and 36R, each set reading right and left partial product digits alternately.

*Alternating contacts.*—To direct the circuits through these sets of contacts, there is provided a set of so-called alternating contacts generally designated 53 (Figs. 1 and 6) comprising separate pairs of contacts designated *a, b, c,* and *d*. A bail 54 pivoted at 55 is rocked by a cam 56 on shaft 31, so that the contacts remain in the position shown during the reading portion of one of the half revolutions and take an alternate position (that is, contacts *b* and *c* close and *a* and *d* open) during the reading portion of the next half revolution. The circuits controlled by these contacts will be explained in connection with the description of the circuit diagram.

A spring urged detenting follower 57 and notched disk 58 are provided to hold shaft 31 in position when at rest.

*Column shift mechanism.*—Referring to Figs. 1 and 10, shaft 31 has secured thereto a cam 65 rotating in the direction indicated, which rocks a spring urged follower lever 66 during the rotation of the shaft. Rack teeth 67 on follower 66 mesh with a gear 68 to oscillate a rod 69 to which there is secured a member 70 having four stopping teeth 71. Spaced around member 70 are four armatures 72, each with an actuating magnet 73, which are designated 1, 2, 3 and 4. The space relationship is such that as cam 65 rotates from the position shown and gear 68 and member 70 rock counterclockwise, energization of the 1 magnet 73 will rock its armature 72 into the path of a tooth 71 to stop member 70 after what may be called one step of advance. Energization of the 2 magnet 73 will intercept a tooth 71 after two steps, energization of the 3 magnet 73 will intercept a tooth after three steps, and energization of the 4 magnet 73 will intercept a tooth after four steps. Thus, by selectively energizing the magnets 73, member 70 and rod 69 may be differentially positioned.

If the first of the magnets 73 is energized after the first tooth has passed its armature, the member 70 and rod 69 advance one step further to a fifth position, wherein the second tooth is intercepted by the first armature. Thus, the shaft may be set in any of five positions each differently spaced from the home or restored position shown in Fig. 10. A pin 75 carried by member 70 engages a member 76 loose on rod 69 to rock the same clockwise against action of spring 77, whereupon fingers 78 will engage and restore the several armatures 72.

A commutator 86 (Fig. 8) secured to rod 69 has ten circular inserts 85 mounted therein. Each insert 85 has a tab 87, all of which lie in a common plane and spaced as shown to cooperate with a ring of wipers 88 which are numbered 1 to 14. When commutator 86 is in its first set position, the ten tabs 87 contact the ten wipers 88 designated 5 to 14. When commutator 86 is in its second set position, the ten tabs 87 contact the ten wipers 88 designated 4 to 13 and so on, until in the fifth postion the ten tabs 87 contact the ten wipers 88 designated 1 to 10. There are two commutators 86 provided, one for the LH components and one for the RH components, and they are diagrammatically represented in Figs. 14*f* and 14*h*, where the tabs 87 and wipers 88 are represented as arrows with those designated 87 shiftable to the right.

PROBLEM

The mathematical steps involved in the solution of a representative problem, 5314270 divided by 2743, are set forth in Fig. 13. Three accumulators are indicated, of which the dividend accumulator is of 20 places and the quotient and divisor accumulators are of 10 places each.

As a preliminary, the dividend and divisor are set up in their respective accumulators in the form of 9's complements as indicated on the line headed "Enter." The quotient accumulator initially stands at 9 in all orders. Since there is no decimal place in the divisor and no decimals are to be computed in the quotient, the units digit of the divivend is entered in the accumulator column farthest to the right. Had the divisor contained one decimal place and two decimal places were required in the quotient, the units digit of the dividend would have been entered in the fourth column from the right, that is, with a shift of three places (the sum of the decimal places in the divisor and quotient) to the left.

The first step in the operation includes adding ½ the divisor to the dividend by entering the 9's complement of ½ the divisor (99 . . . 986284) into the dividend accumulator. The resulting addition causes the elusive 1 entry as a tens carry into the units order as indicated. This ½ divisor value is obtained by multiplying the divisor by 5 as will be explained in connection with the circuit diagram.

A selection of a trial quotient digit 2 is now made jointly by the two highest digits of both the adjusted dividend and the divisor, and multiplying takes place to enter the left hand component of 2 times the divisor into the dividend accumulator in the orders indicated. Following this, the right hand component of 2 times the divisor is entered and at the same time a 2 is entered as a 9's complement into the quotient accumulator. The resulting summation leaves a positive remainder in the dividend accumulator, which is indicative of an overdraft; that is, the 2 selected is a unit too high. This is corrected by adding 1 times the divisor (complementarily) and concurrently subtracting 1 from the quotient accumulator.

The process is now repeated with the remainder 99 . . . 97415014, the two highest places (25) of its true value acting jointly with the two highest places (27) of the divisor to select 8 (which has a "tenths" value) as the next trial quotient digit. Multiplying by 8 and entry of the components into the dividend accumulator is accompanied by entry of 8 (as a complement) into the quotient accumulator. The remainder indicates an underdraft (evidenced by circuit conditions to be explained).

Correction follows by subtracting 1 times the divisor and addition of a 1 to the quotient digit, leaving the new remainder of 99 . . . 883714.

The next selection is 4 (tenths) which, after multiplying, leaves the remainder 99 . . . 3434 and the complement of the quotient 1940 rounded to three places. Since the machine was preliminarily set to compute to only three places, operations are terminated at this point.

THE CIRCUIT DIAGRAM

The manner in which the foregoing operations are carried out will now be explained in connection with the circuit diagram (Figs. 14a to 14n) and in conjunction therewith the sequence chart (Figs. 15a to 15d) indicates the relay magnets involved and the order in which they are energized, together with their periods of energization. In the circuit diagram, several cam controlled contacts prefixed C are represented, and these are operated by cams on the constantly rotating shaft 10 with the timing of the contacts being represented in Fig. 16 for each cycle of operation of the machine. Also in the circuit diagram, relay magnet contacts are generally shown adjacent their controlling magnets, and in cases where the contacts are in circuits remote from the related magnets such magnets are represented in dotted outline next to the contacts to facilitate their identification.

Figure 14D:
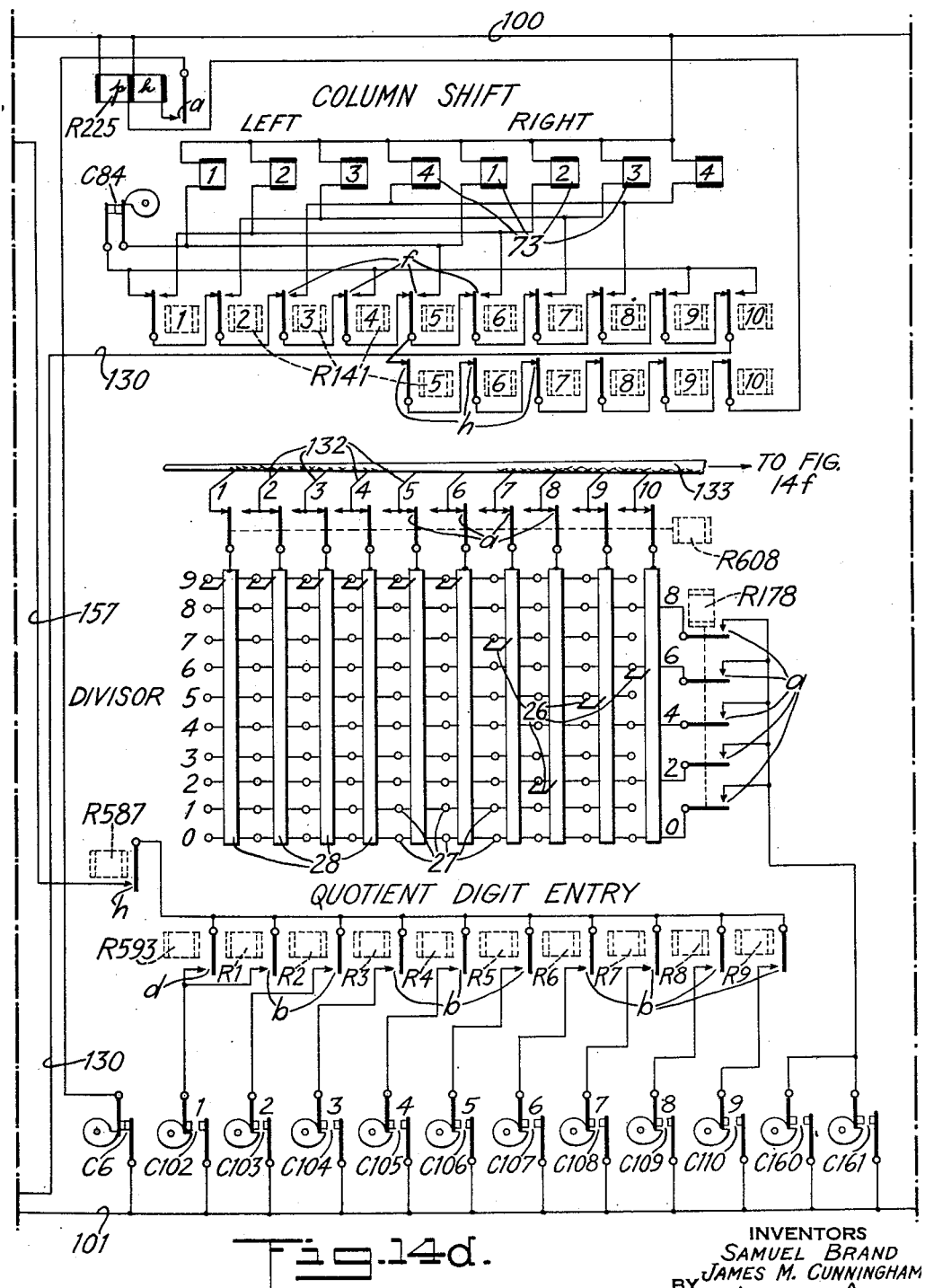

In the circuit diagram, it is assumed that current is supplied from a suitable source to main lines designated 100 and 101. The dividend is assumed to be manually set in the dividend accumulator, for purposes of simplicity of explanation, by adjusting the readout brushes 26 (Fig. 14g) to represent the 9's complement of 5314270 as indicated by the setting of the brushes. As explained in connection with the problem, the dividend is entered with its units order in the right hand columnar position. The divisor 2743 is entered by positioning the brushes 26 in Fig. 14e to represent the 9's complement 99 . . . 97256 as indicated. A duplicate setting of the divisor on a second set of brushes 26 shown in Fig. 14d is also made and throughout the operation of the machine both of these divisor settings will remain unchanged.

Referring to Fig. 14a, a preliminary plug connection 103 is made from the plug socket of a group designated 104 and labeled In to the 3 socket. The particular numbered socket which is connected to the In socket is determined by the desired number of places to be obtained in the quotient. In the present case, where three places are to be computed the connection 103 is made to the 3 socket.

CYCLE 1—PRELIMINARY CYCLE

Following the preliminary settings and with the main drive shaft 10 in operation, so that the C cams are functioning, the operator will close switch 105 (Fig. 14h) so that, when contacts C58 close, relay magnet R606 will be energized. This magnet will close its a contacts to provide a holding circuit through contacts C59 to maintain the magnet energized for the period indicated in Fig. 15a during the so-called preliminary cycle. The magnet R606 also closes a pair of b contacts to energize magnet R596 which in turn closes its a contacts to provide a holding circuit through normally closed a contacts of a magnet R602, which latter will not be energized until near the end of the computing operation, so that magnet R596 will remain energized throughout computing operations.

Figure 14E:
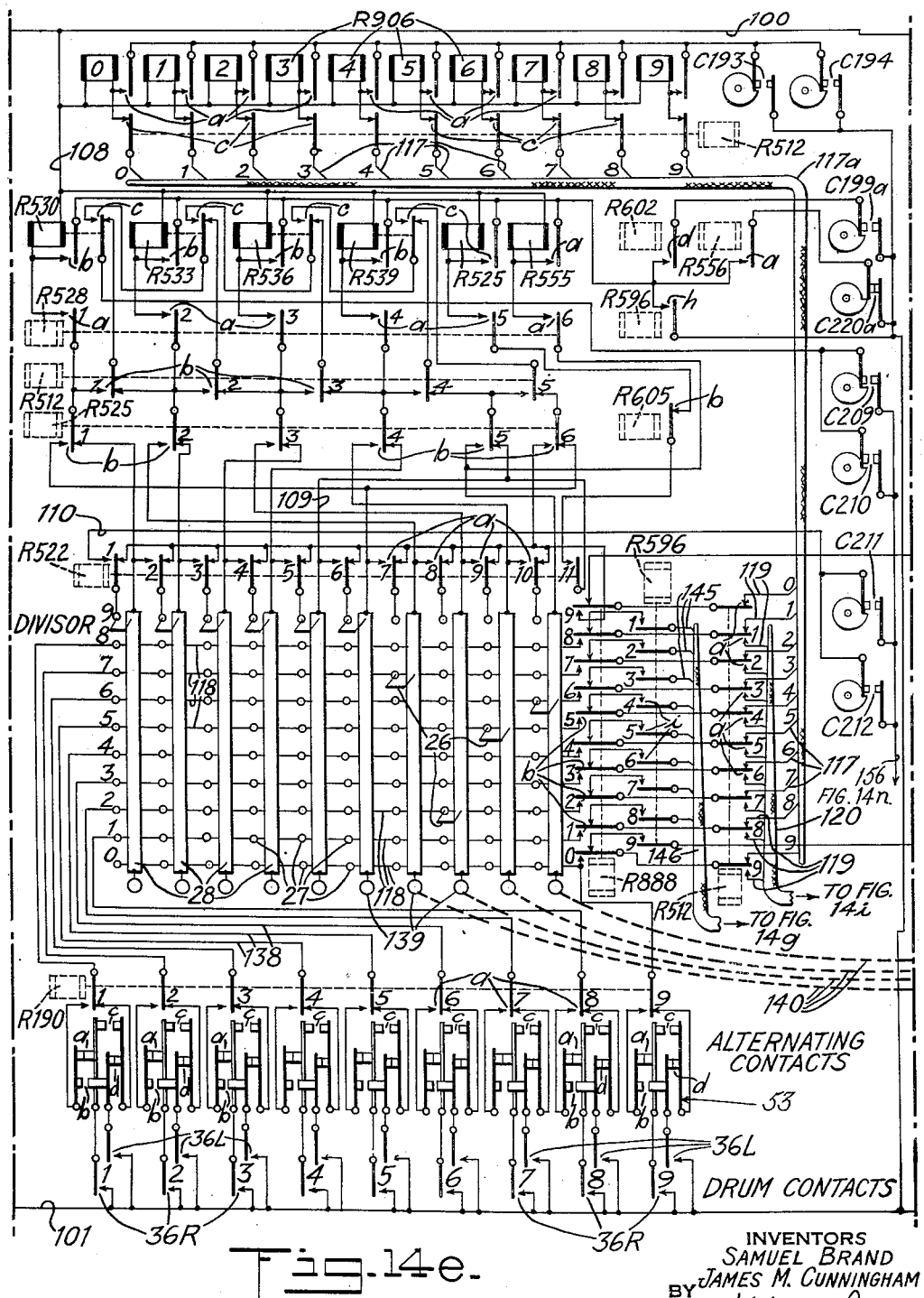
Figure 14F:
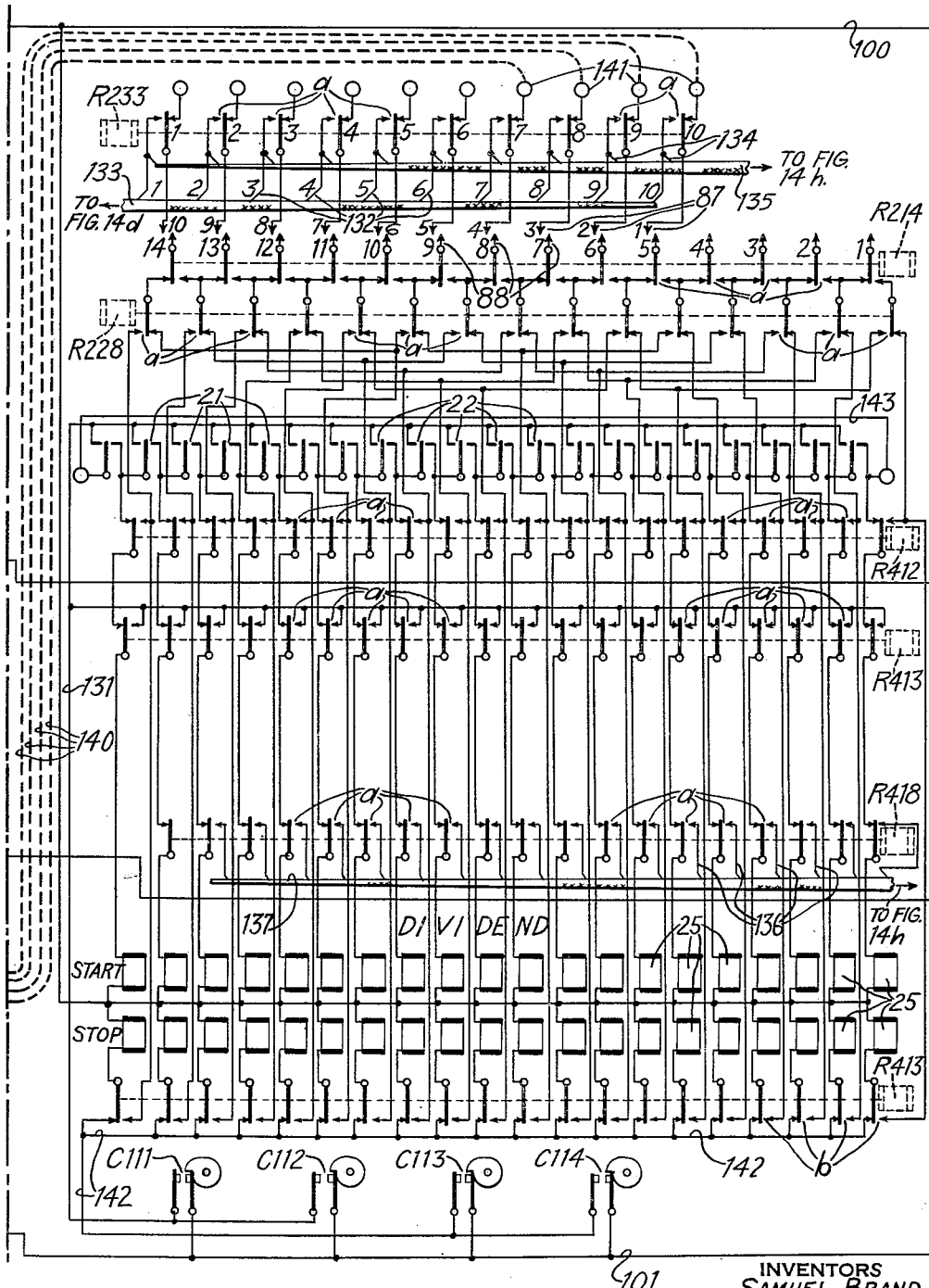
Figure 14I:
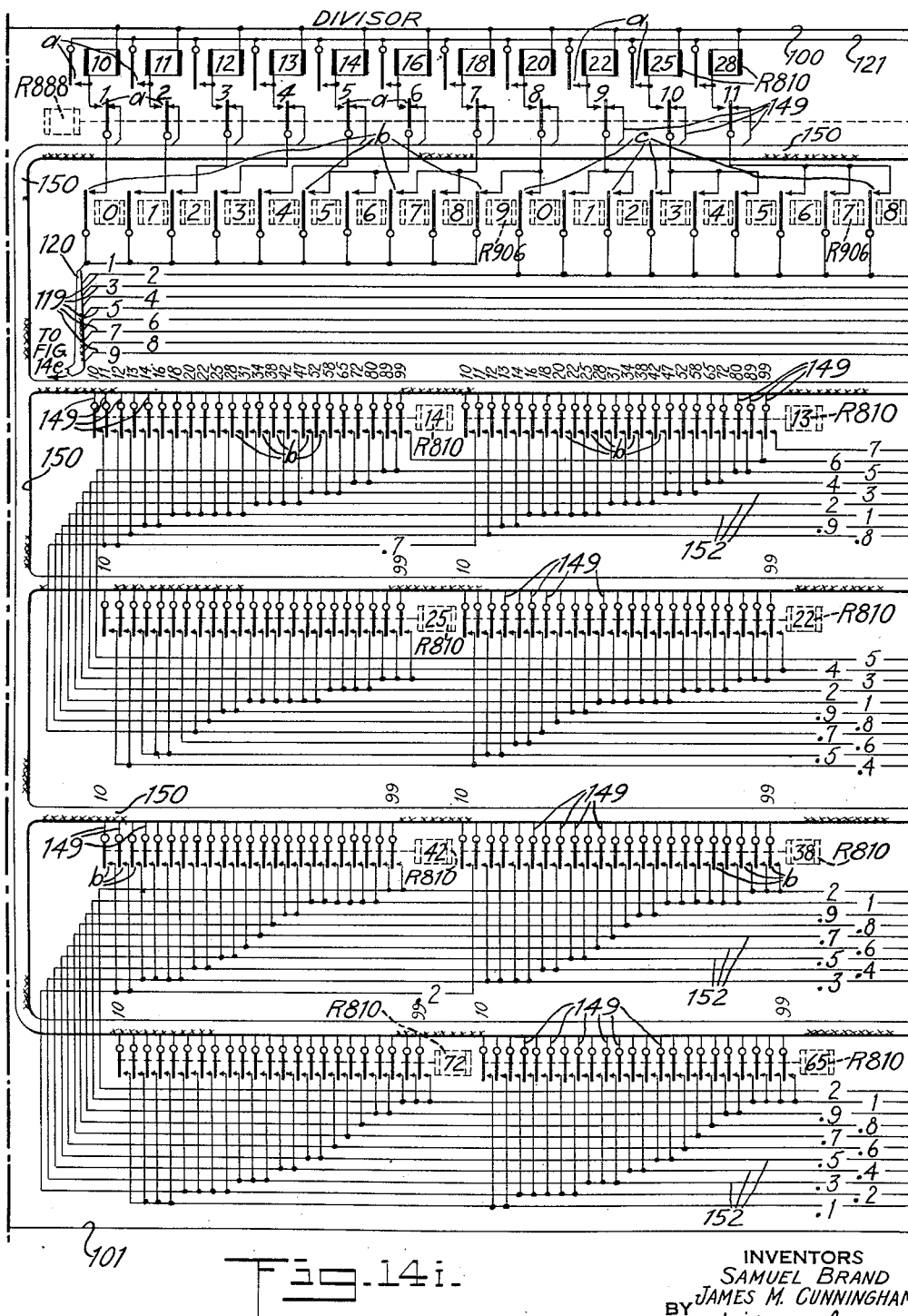
Figure 14J:
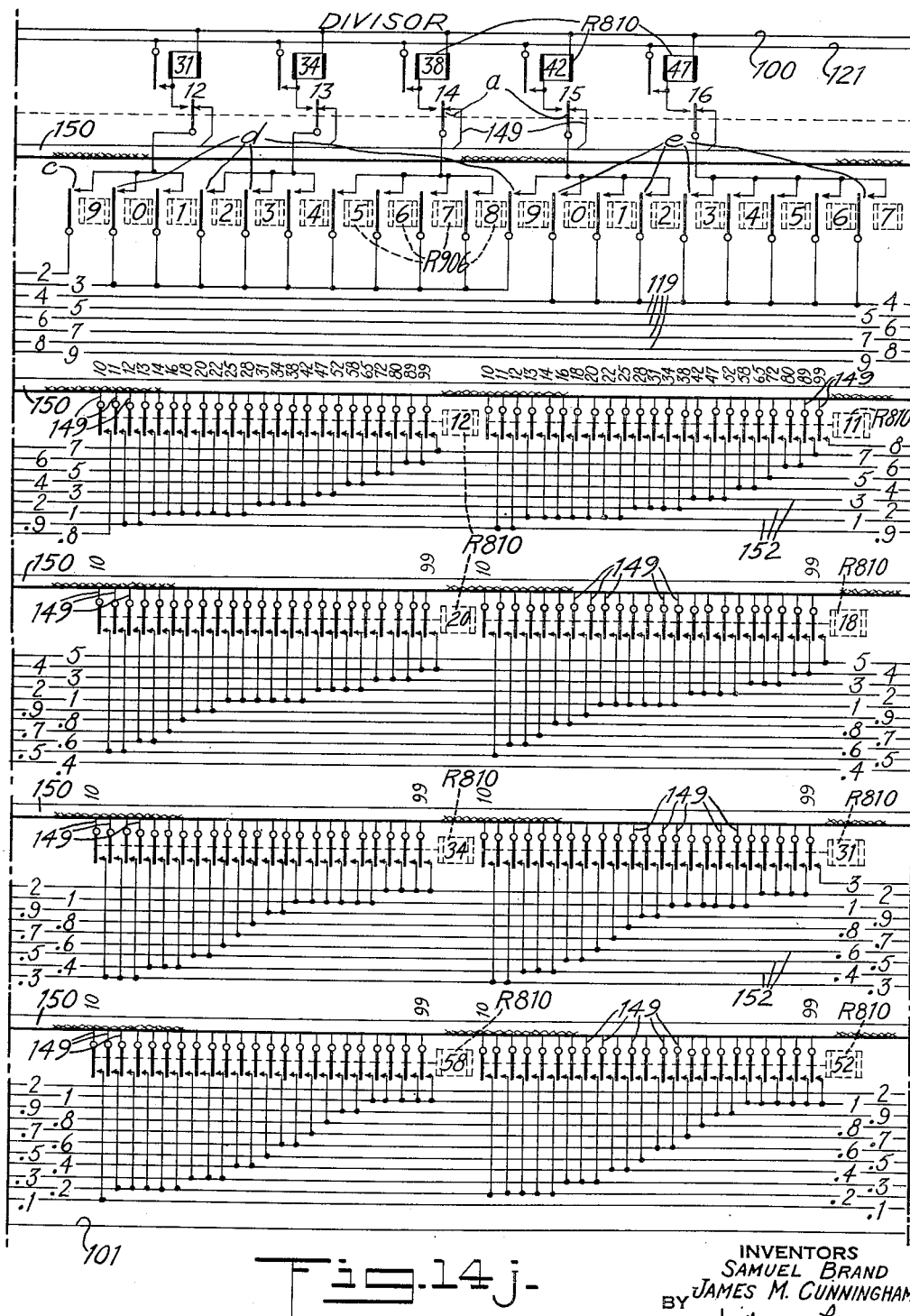
Figure 14K:
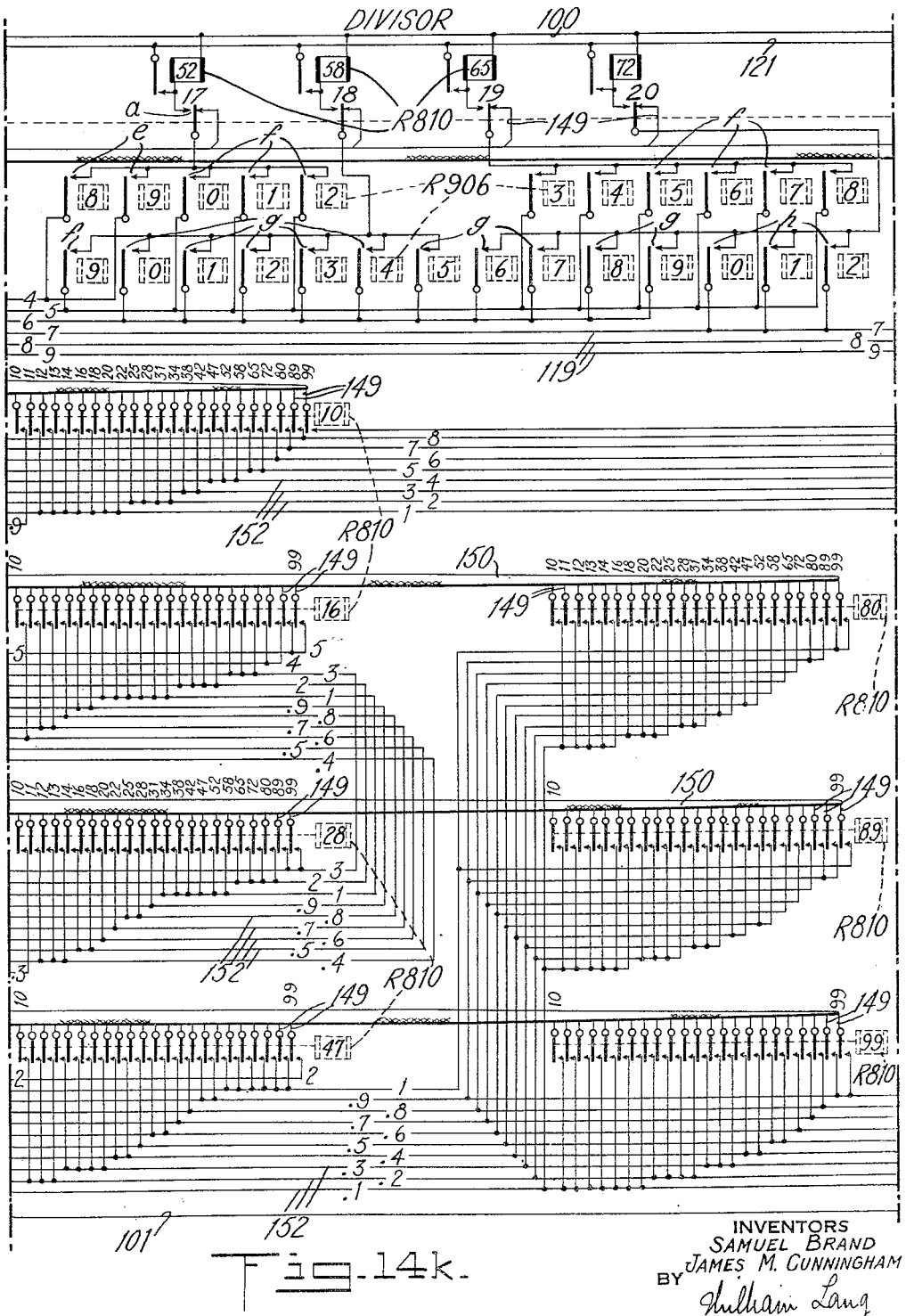
Figure 14M:
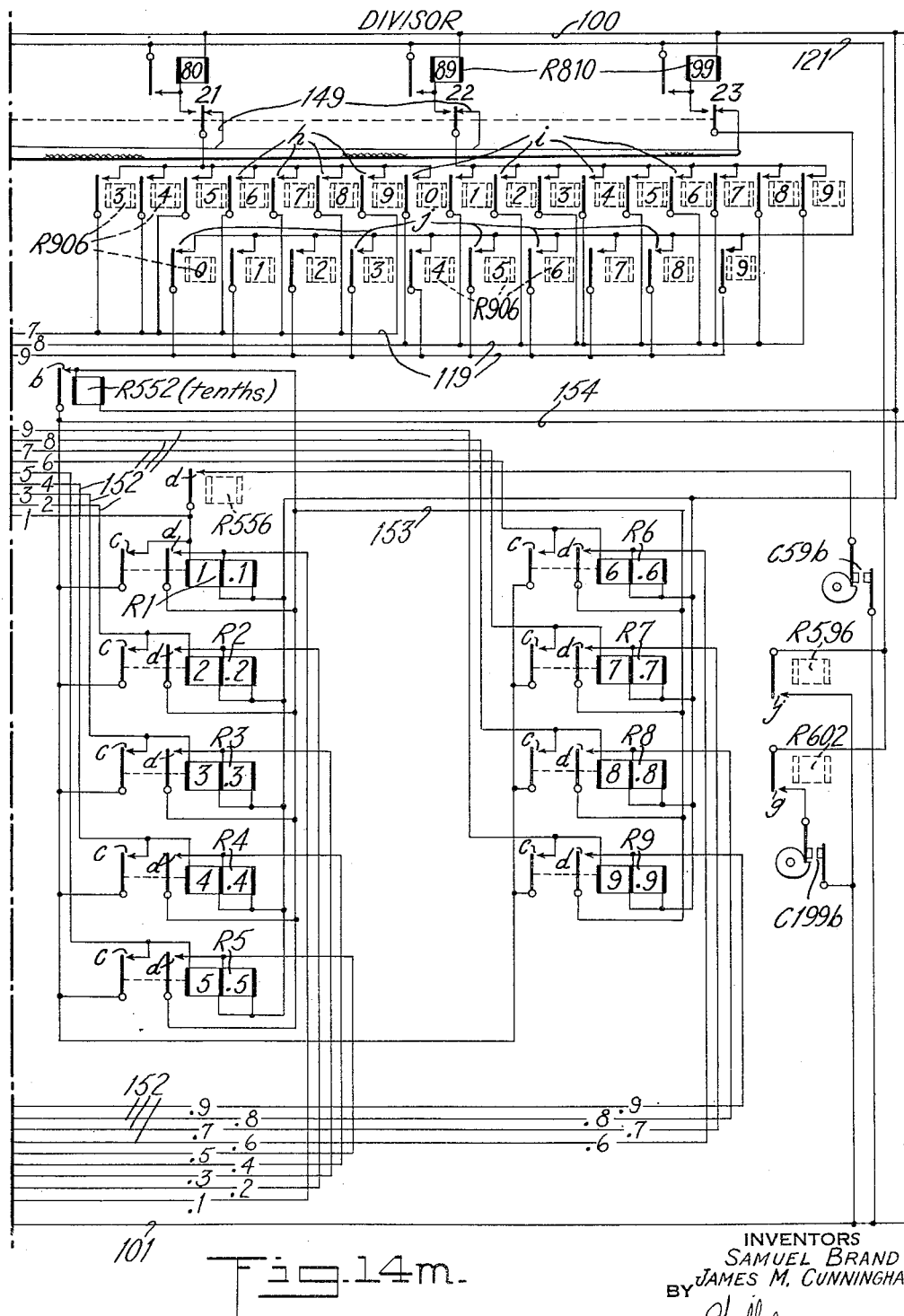
Figure 14N:
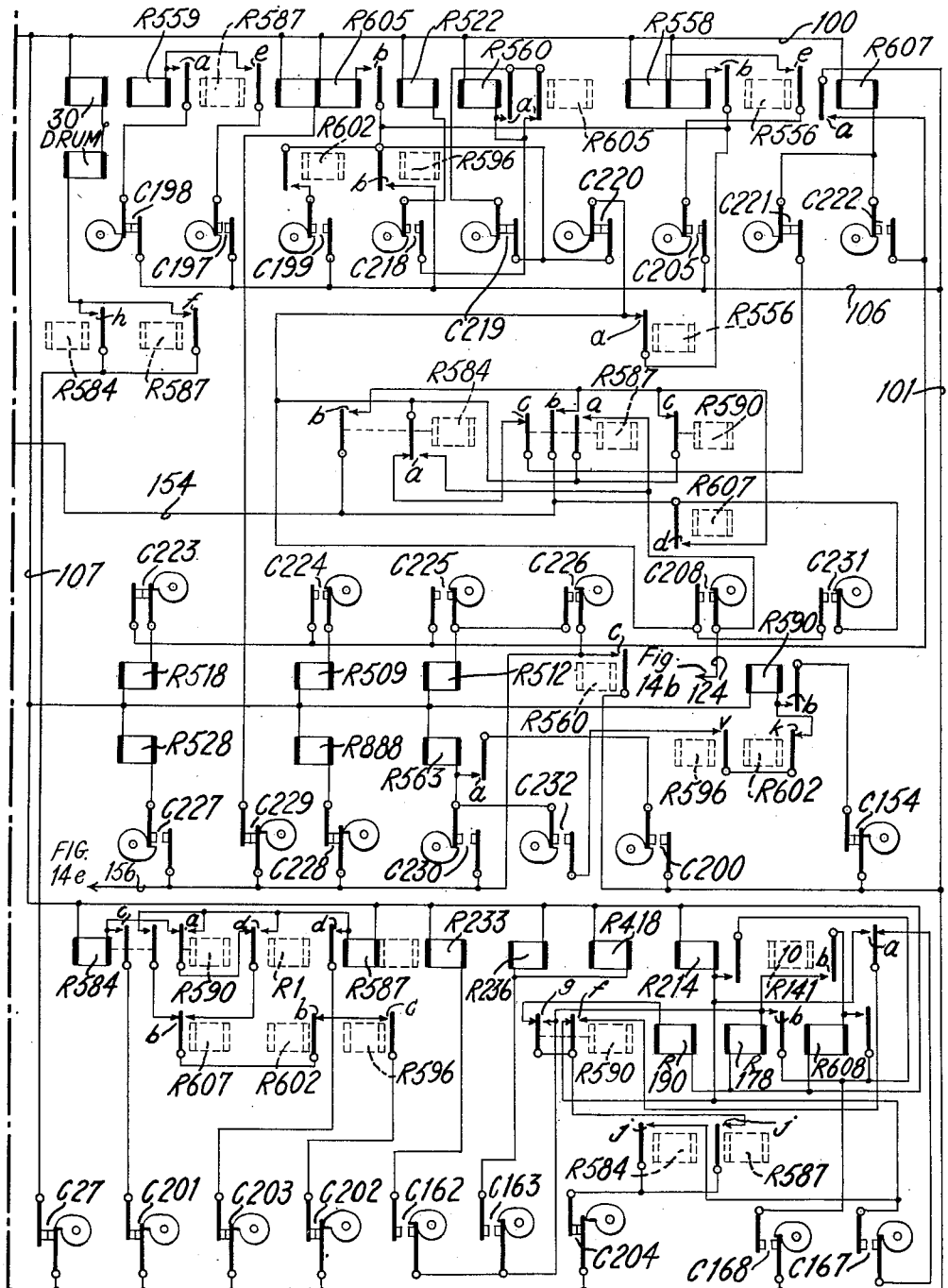
Figure 15A:
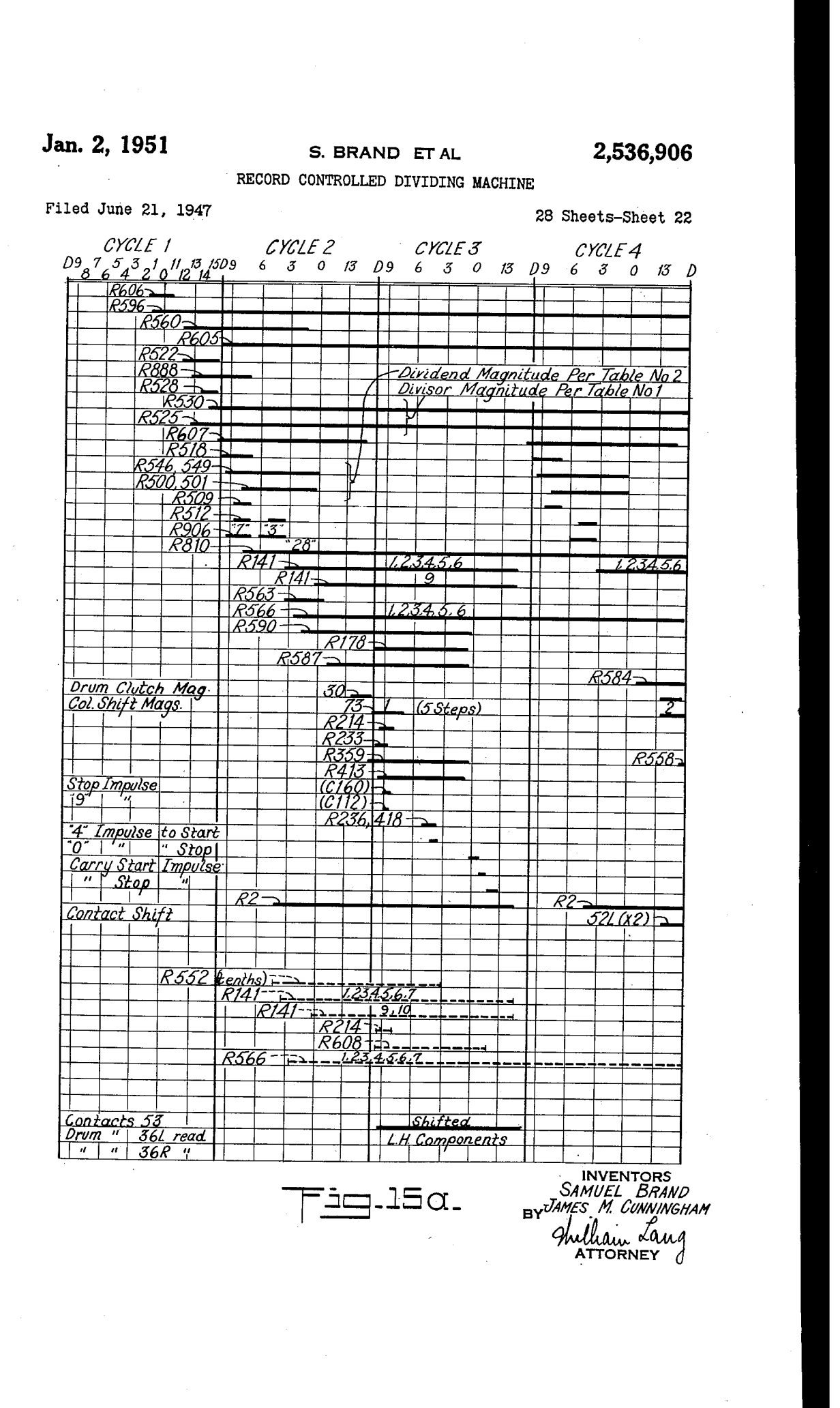

Referring now to Fig. 14n, magnet R596 closes a pair of b contacts (upper part of Fig. 14n) through which a circuit is completed when contacts C219 close, which is traceable from line 101, wire 106, b contacts of magnet R596, contacts C219, a contacts of a magnet R605, magnet R560 to line 100. Magnet R560 closes its a contacts to provide a shunt around the a contacts of magnet R605. This magnet R605 is energized at the beginning of the second cycle as indicated in Fig. 15a, and the energizing circuit is traceable in Fig. 14n from line 100, left hand winding of magnet R605, contacts C229, c contacts of magnet R560 (now closed), to line 101. Magnet R605 closes its b contacts setting up a holding circuit through the b contacts of magnet R596 (now closed) and wire 106, so that magnet R605 as indicated will remain energized throughout the computing operations. Concurrently with the energization of magnet R560, there is a circuit branching from the a contacts of magnet R605 through cam contacts C218 to energize magnet R522 whose duration of energization will be as indicated in Fig. 15a.

A magnet R888 (Fig. 14n) is energized from line 100, wire 107, magnet R888, contacts C228, the c contacts of magnet R560 to line 101, and shortly thereafter through a parallel circuit under control of contacts C227, magnet R528 is energized for a short period as indicated in Fig. 15a.

*Testing for magnitude of the divisor.*—Referring to Fig. 14e, a circuit is traceable from line 100, wire 108, magnet R525, a contacts of magnet R528 numbered 5, b contacts of magnet R605 (not yet energized), a contacts of magnet R522 numbered 11 (now closed), wire 109 to the conductor 28 in the fifth order from the left of the divisor setup, thence through the brush 26 in this order (which is set at 9), a contacts of magnet R522 designated 5 (shifted), thence in series through the conductors 28 and brushes 26 in the four orders on the left to wire 110, contacts C211 and line 101. Inspection will show that the presence of five or more 9's standing at the left of the divisor setting will result in energization of magnet R525. If there are less than five, this magnet will not be energized.

With the magnet R525 energized, its b contacts will be shifted so that a circuit will be completed from line 100, wire 108, magnet R530, a contacts numbered 1 of magnet R528, the b contacts of magnet R525 (numbered 1), thence serially through the six brushes 26 set at 9 in the divisor setup device and wire 110 to line 101, through contacts C212. Magnet R525 closes its c contacts and magnet R530 closes its b contacts to provide holding circuits extending from line 100 and wire 108, through these two magnets and their contacts, through the h contacts of magnet R596 (now closed) to line 101.

It will be noted that the circuit arrangement in Fig. 14e provides for the energization of magnets R530, R533, R536, R539, R525 and R555 in various combinations depending upon the number of 9's present in the divisor setup device, and this constitutes what may be termed a simplified column shift control device for the divisor. Inspection will show that the several magnets are energized in accordance with the following table in which, in the left hand column, there is listed the possible number of 9's settable at the left end of the device, and in line therewith is indicated the particular magnet or magnets that are energized. The tracing of the circuits for these magnets is similar to those traced for the specific problem so that such tracing is not repeated. Briefly, the energization of magnet R522 effects a "test" of the divisor setting which results for the problem considered in energization of magnets R530 and R525 which will be held energized throughout subsequent operations as indicated in the sequence diagram (Fig. 15a).

*Table No. 1*

| Number of 9's at Left | R530 | R533 | R536 | R539 | R525 | R555 |
|---|---|---|---|---|---|---|
| 10 | X | X | X | X | X | X |
| 9 | X | X | X | X | X | — |
| 8 | X | X | X | — | X | — |
| 7 | X | X | — | — | X | — |
| 6 | X | — | — | — | X | — |
| 5 | — | — | — | — | X | — |
| 4 | X | X | X | X | — | — |
| 3 | X | X | X | — | — | — |
| 2 | X | X | — | — | — | — |
| 1 | X | — | — | — | — | — |
| 0 | — | — | — | — | — | — |

X=energized, —=unergized.

The foregoing explains the manner in which the divisor is tested to ascertain the number of zeros at the left and this, of course, is done indirectly by ascertaining the number of 9's set up.

Referring to Fig. 14n, a magnet R607 is also energized near the end of the cycle through a circuit traceable from line 100, magnet R607 (upper right), contacts C221, c contacts of magnet R587, a contacts of magnet R534, a contacts of magnet R556, b contacts of magnet R599 and wire 106 to line 101. Magnet R607 will close its a contacts to provide a holding circuit from line 100, magnet R607, contacts C222, a contacts of the magnet to line 101.

CYCLE 2—FIRST DIVIDEND TEST CYCLE

At the commencement of this cycle, magnet R605 is energized as already explained.

*Test for magnitude of the dividend.*—Referring to Fig. 14g, closure of contacts C215 will complete a circuit from line 101, contacts C215, wire 111, k contacts of magnet R599 (shifted), brush 26 in the second order from the left of the dividend accumulator (set at 9) to the related common conductor 28, thence serially through the a contacts of magnet R518 (energized as will be presently explained) and the brushes 26 of adjacent orders of the dividend accumulator to the eleventh columnar order from the left, thence through wire 112, contacts C217, c contacts of magnet R597 (now closed), a contacts of magnet R509 and magnets R546 and R549 in parallel to line 100. Magnet R546 closes its a contacts to provide a holding circuit through wire 115 and contacts C195.

A parallel circuit extends serially through the brushes 26 as before up to the conductor 28 in the thirteenth columnar order from the left and then extends through wire 113, a contacts numbered 2, of magnet R549 (now energized), b contacts numbered 2 of magnet R509 (now closed) and magnet R501 to line 100. This magnet closes its a contact to provide a holding circuit through wire 115 and contacts C195. A further parallel circuit is traceable serially as before through the brushes 26 up to the conductor 28 in the twelfth column, wire 114, a contacts numbered 1 of magnet R549, b contacts numbered 1 of magnet R509 and magnet R500 to line 100, which will hold through its a contacts together with magnets R501, R546 and R549.

Magnet R518 which controls the foregoing circuits is energized through a circuit from line 100 (Fig. 14n), wire 107, magnet R518, contacts C223, a contacts of magnet R607 to line 101. Magnet R509 is energized through a parallel circuit from line 100, wire 107, magnet R509, contacts C224, a contacts of magnet R607 to line 101.

Accordingly, for the problem under consideration the magnets R500, R501, R546 and R549 are energized where the dividend accumulator contains thirteen consecutive 9's from the left. In other cases, the magnets energized will be in accordance with the following table and the circuits involved in their selection will be apparent from inspection of the circuit diagram.

Briefly, magnet R518 is first energized to direct the circuits to magnet R546, R549 to determine whether or not they are to be energized. Later, magnet R509 is energized to direct additional circuits to magnets R500 to R508.

*Table No. 2*

| Number of 9's at Left | R500 | R501 | R502 | R503 | R504 | R505 | R506 | R507 | R508 | R546 R549 |
|---|---|---|---|---|---|---|---|---|---|---|
| 20 | X | X | X | X | X | X | X | X | X | X |
| 19 | X | X | X | X | X | X | X | X | — | X |
| 18 | X | X | X | X | X | X | X | — | — | X |
| 17 | X | X | X | X | X | X | — | — | — | X |
| 16 | X | X | X | X | X | — | — | — | — | X |
| 15 | X | X | X | X | — | — | — | — | — | X |
| 14 | X | X | X | — | — | — | — | — | — | X |
| 13 | X | X | — | — | — | — | — | — | — | X |
| 12 | X | — | — | — | — | — | — | — | — | X |
| 11 | — | — | — | — | — | — | — | — | — | X |
| 10 | X | X | X | X | X | X | X | X | — | — |
| 9 | X | X | X | X | X | X | X | — | — | — |
| 8 | X | X | X | X | X | X | — | — | — | — |
| 7 | X | X | X | X | X | — | — | — | — | — |
| 6 | X | X | X | X | — | — | — | — | — | — |
| 5 | X | X | X | — | — | — | — | — | — | — |
| 4 | X | X | — | — | — | — | — | — | — | — |
| 3 | X | — | — | — | — | — | — | — | — | — |
| 2 | — | — | — | — | — | — | — | — | — | — |
| 1 | — | — | — | — | — | — | — | — | — | — |
| 0 | — | — | — | — | — | — | — | — | — | — |

X=energized, —=unenergized.

*Divisor control of quotient digit selection.*—Referring to Fig. 15a, the 7 magnet R906 is energized near the beginning of the test cycle (Fig. 14e) through a circuit traceable as follows upon closure of cam contacts C209: from line 101, contacts C209, c contacts of magnet R530 (now shifted), c contacts of magnet R533 (normal), b contacts numbered 2 of magnet R512 (normal), b contacts numbered 3 of magnet R525 (now shifted) to the conductor 28 of the column of the divisor setup containing the second highest order digit of the divisor, namely, the value 7 in complementary form. From this conductor the circuit continues through the brush 29 in the 2 position to the 2 wire of a group 118, thence through the *b* contacts of magnet R888 numbered 2 (now shifted), *a* contacts of magnet R512, 7 wire of a group designated 117 in cable 117*a*, *c* contacts of magnet R512, the 7 magnet R906 to line 100. This magnet closes its *a* contacts to provide a holding circuit through cam contacts C193 for the period indicated in Fig. 15*a*.

The circuit arrangement is such and inspection will show that, upon closure of contacts C209, a circuit will be completed to energize the one of the magnets R906 corresponding to the true digital value in the second highest order of the divisor.

The group of magnets R530, R533, R536, R539, R525 and R555 under control of the presence of 9's in the left section of the divisor setup device determines the location of the significant divisor digits so that, when contacts C209 close, the circuits are directed through the proper channels to test the second highest divisor digit and energize one of the magnets R906 according to the corresponding value. For the present example, the second highest divisor digit is 7. Therefore, the 7 magnet R906 is the one to be energized.

Later in the cycle, when contacts C210 close, which is after the magnet R512 has been energized as already explained (see Fig. 15*a*), a circuit will be completed through the divisor columnar order containing the highest order digit of the divisor, for the purpose of selecting one of group of twenty-three magnets generally designated R810 extending across the top of Figs. 14*i*, 14*j*, 14*k* and 14*m*. These magnets are given the values 10, 11, 12, 13, 14, 16, 18, 20, 22, 25, 28, 31, 34, 38, 42, 47, 52, 58, 65, 72, 80, 89 and 99. The divisor setting representing the two highest order significant digits will control energization of the one of these magnets corresponding to the value of such setting or the one that corresponds to the nearest higher value. Thus, for example, in the present case where the setting of the two highest digits of the divisor represents 27, the magnet R810 to be energized will be the one designated 28 and this will be effected as follows. Closure of contacts of C210 in Fig. 14*e* will establish a circuit from line 101, contacts C210, *c* contacts of magnet R530 (shifted), *c* contacts of magnet R533 (normal), *b* contacts of magnet R512 numbered 2 (now shifted), *b* contacts numbered 2 of magnet R525 (shifted), conductor 28 in the fourth position from the right containing the highest divisor digit, thence through its brush 29 to the 7 wire 118, the *a* contacts numbered 7 of magnet R888 (shifted), *a* contacts of magnet R512 (now shifted) to the 2 wire 119, which extends through a cable 120 (Fig. 14*i*), where the 2 wire 119 continues the circuit through a pair of *c* contacts of the 7 magnet R906 (now closed), *a* contacts of magnet R888 (shifted), magnet R810 numbered 28 to line 100.

This magnet closes its *a* contacts to provide a holding circuit through wire 121 (Figs. 14*j*, 14*k* and 14*m*) to close *j* contacts of magnet R596 to line 101, so that the selected magnet R810 will remain energized throughout computing operations as indicated on the sequence diagram (Fig. 15*a*). In a similar manner, others of the magnets R810 are selected in accordance with the value of the two highest positions of the divisor and, since throughout the dividing operations this value remains the same, the setting is retained.

Briefly, the devisor setup device of Fig. 14*e* is tested and a setting of relay magnets R530, R533, R536, R539, R525 and R555 is made selectively in accordance with the magnitude of the divisor. These magnets select and direct a circuit through the divisor order containing the second highest divisor digit and energize the appropriate magnet R906. Magnet R512 then effects a so-called column shift and circuits are again selected and directed through the divisor order containing the highest divisor digit and through contacts of the previously selected magnet R906 to energize a magnet R810 appropriate to the value of the two highest divisor digits, which value may be termed a "corrected divisor" value. The R906 selection is temporary while the R810 selection is maintained through subsequent computing operations as represented on the sequence diagram.

*Column skip selecting circuits.*—Continuing the sequential operations according to cycle 2 (see Fig. 15*a*), when contacts C207 close (Fig. 14*b*), circuits are completed to energize the column skip relay magnets R141 numbered 1, 2, 3, 4, 5 and 6. It will be recalled that during the earlier testing of the dividend setting, magnets R530 and R525 were energized in accordance with the number of true value zeros to the left of the division, and that magnets R546 and R549 were also energized together with magnets R500 and R501. Accordingly, when contacts C207 close, a circuit completed from line 101 through contacts C207 (Fig. 14*b*), *b* contacts numbered 7 of of magnet R549 (shifted) downward through these contacts in the 7 position, *a* contacts numbered 2 of magnet R525 (shifted), *a* contacts of magnet R530 numbered 1 (shifted), thence serially through *a* contacts of magnets R533, R536 and R539 (normal), the 1 magnet R141 and wire 122 to line 100. A parallel circuit extends to the 2 magnet R141 which flows from the *b* contacts numbered 8 of magnet R549 to the *a* contacts numbered 3 of magnet R525, *a* contacts numbered 2 of magnet R530, and thence down to the *a* contacts of magnets R533, R536 and R539 numbered 2 to the 2 magnet R141. The *a* contacts of magnet R549 numbered 9 control a similar parallel circuit to energize the 3 magnet R141.

This circuit branches from the *b* contacts numbered 9 of magnet R549, through *a* contacts numbered 4 of magnet R525, thence through the *a* contacts numbered 3 of magnet R530 and thence to the 3 magnet R141. The 4 magnet R141 is energized through a similarly traceable circuit extending from the *b* contacts numbered 10 of magnet R549. The 5 and 6 magnets R141 will be energized through different circuit paths of which the one for the 5 magnet is traceable from line 101, contacts C207, *b* contacts of magnet R500, *a* contacts numbered 2 of magnet R552 (normal), *b* contacts numbered 1 of magnet R546 (shifted), *a* contacts numbered 6 of magnet R525, *a* contacts numbered 5 of magnet R539, and thence downwardly to the 5 magnet R141.

For the 6 magnet R141, the circuit extends from *b* contacts of magnet R501, *a* contacts numbered 3 of magnet R552, *b* contacts numbered 2 of magnet R546, thence through the *a* contacts numbered 7 of R525, the *a* contacts numbered 6 of magnet R539 and down to 6 magnet R141.

Each of the magnets R141 closes a pair of *a* contacts to provide a holding circuit which is traceable from line 100, wire 122, through the magnet and its a contacts to a wire 123, thence through the g contacts of magnet R596 (now closed), wire 124 (Fig. 14n), where the circuit continues through contacts C208, C220, b contacts of magnet R596 (closed) and wire 106 to line 101.

When contacts C202 (bottom, Fig. 14n) close, a circuit is completed through the c contacts of magnet R596, b contacts of magnet R692, b contacts of magnet R607 (shifted), d contacts of magnet R1 (normal), a contacts of magnet R599 (shifted, as will presently be explained), magnet R587 and wire 107 to line 100. Magnet R587 closes its d contacts to provide a holding circuit through contacts C293 so this magnet will remain energized for a period indicated in Fig. 15a. Sometime during this period, the cam contacts C208 open to drop out the holding circuit for the magnets R141 but at such time the a contacts of magnet R587 are closed to provide a shunt around contacts C208, so that the holding circuit for magnets R141 is maintained during the interval that contacts C208 are open.

Magnet R563 is energized through a circuit from line 101 (Fig. 14n), c contacts of magnet R569, contacts C239, magnet R563 and wire 107 to line 100. It closes its a contacts to hold through contacts C299. Magnet R599 is thereafter energized through a circuit traceable from line 101 (Fig. 14n), cam contacts C209, a contacts of magnet R563, contacts C232, the v contacts of magnet R596, k contacts of magnet R692 and magnet R599 to wire 107 and line 100. This magnet closes its b contacts to provide a holding circuit through contacts C154 which hold the magnet energized for the period indicated in Fig. 15a.

Magnet R599 shifts its g contacts in Fig. 14n so that, when contacts C204 close at the beginning of cycle 3, a circuit is traceable from line 101, the j contacts of magnet R587 (shifted), g contacts of magnet R599 (shifted) and magnet R170 to wire 107 and line 100, and this magnet closes its b contacts to provide a holding circuit through cam contacts C168.

Referring to Fig. 14a, the 1 to 6 magnets R141, which were previously energized, have closed their b contacts so that, when cam contacts C166 close, a circuit is completed from line 101, through z contacts of magnet 596 (shifted), contacts C166, wire 126, the b contacts of magnets R141 numbered 1 to 6, the d contacts of magnet R599 (shifted), and thence through the 1 to 6 magnets R566 to line 100. These magnets close their a contacts to provide parallel holding circuits through the z contacts of magnet R596 and in parallel through cam contacts C149, so that these magnets remain energized throughout computing operations.

Recapitulating briefly, the magnet group R500, R501, R502, R503, R504, R505, R506, R508 and R549 energized in accordance with the dividend magnitude, and the magnet group R532, R533, R536, R539, R525 and R555 energized in accordance with the divisor magnitude jointly control a circuit network in Fig. 14b to energize a number of magnets R141, which for a seven-place dividend (entered at the right end of its accumulator) and a four-place divisor is 6. For other factor magnitudes, the number of magnets R141 energized will be in accordance with the following table No. 3 which sets forth as a ratio the relationship between the dividend and divisor which will cause energization of magnets R141. Thus, for example, if the ratio is 10 to 3, two magnets R141 are energized, etc. Under certain conditions where a decimal place is involved, as will be explained later, an additional magnet R141 will be energized for the ratios listed.

*Table No. 3*

| Ratio of Dividend Places to Divisor Places | Number of R141 Magnets Energized |
| --- | --- |
| 10 to 1 | 0 |
| 10 to 2 | 1 |
| 10 to 3 | 2 |
| 10 to 4 | 3 |
| 10 to 5 | 4 |
| 10 to 6 | 5 |
| 10 to 7 | 6 |
| 10 to 8 | 7 |
| 10 to 9 | 8 |
| 10 to 10 | 9 |

In the problem under consideration where the number of dividend places is 7 and the number of divisor places is 4, which is a ratio of 10 to 7, the number of magnets R141 is 6.

The settings of selected magnets R141 is subsequently transferred to magnets R566 in Fig. 14a to effect a like setting of these, which is retained throughout computing operations.

*Multiplying drum clutch circuits.*—Referring to Fig. 14a, a circuit is traceable from line 101, through cam contacts C189, d contacts numbered 11 of magnet R563 (shifted) to the plug socket 104 designated In, connection 103, 3 socket 104, from where the circuit extends upwardly through the network of b contacts controlled by the magnets R566, of which those numbered 1 to 6 are now energized. The circuit extends through these contacts to the 9 wire of the group designated 128, which continues through cable 129 of Fig. 14b, where the 9 wire 128 continues to the 9 magnet of the R141 group. This magnet will thereafter be held along with the previously energized magnets of the same group.

Referring to Fig. 14n, magnet R587 is now energized through a circuit traceable from line 101, contacts C202, c contacts of magnet R596, b contacts of magnet R692, b contacts of magnet R607 (shifted), d contacts of magnet R1, a contacts of R599 (shifted), magnet R587 and wire 107 to line 100. This magnet will close its d contacts to provide a holding circuit through cam contacts C293. In the upper left part of Fig. 14n, magnet R587 closes its f contacts so that upon closing of cam contacts C27 a circuit is completed through the f contacts of magnet R587 to energize the drum clutch magnet 30, and the multiplying drum shaft 31 (Fig. 1) will now be driven a half revolution during which impulses will be emitted to enter 5 times the divisor into the dividend accumulator. In carrying out this operation, the divisor amount 2743 is multiplied by 5 and the product is additively entered into the dividend accumulator in the proper denominational positions during the half revolution of the multiplying drum.

COLUMN SHIFT CIRCUITS

The column shift circuits direct the entries of products into the proper denominational orders of the dividend and quotient accumulators. A circuit is traceable from line 100 (Fig. 14d) in parallel through the two 1 magnets 73, cam contacts C84, the f contacts of the 9 magnet R141 (now shifted), through the f contacts of the 10 magnet R141, wire 130 (Figs. 14c and 14b), contacts C82, g contacts of magnet R587 (now closed), g contacts of magnet R586 to wire 124 and from there to line, as previously explained. Referring to the sequence chart, the timing of this operation is such that the 1 magnets 73 (Fig. 10) are energized after the first tooth 71 of the ratchet plate 70 has passed the armature of the 1 magnet so that the rod 69 will rotate until the second tooth is intercepted by the magnet armature, thus allowing the tabs 87 of Fig. 8 to move to their extreme position where the leading finger contacts the 1 wiper 88. These devices are represented diagrammatically in Fig. 14f.

In the circuit diagram, the effect of the column shift is to adjust the tabs 87 (Fig. 14f) and 87a (Fig. 14h) together so that both sets are displaced five steps toward the right with respect to their cooperating wipers 88 and 88a. Specifically, the right hand tabs 87 and 87a are brought into engagement respectively with the right hand wipers 88 and 88a, and the remaining contacts follow in sequence to direct the subsequent circuits to the dividend accumulator.

At this time relay magnet R214 is energized through a circuit traceable in Fig. 14n from line 101, contacts C204, j contacts of magnet R587, f contacts of magnet R590 (shifted), a contacts of 10 magnet R141 (normal), contacts C167, magnet R214 to line 100, through wire 107. Next, the magnet R233 is energized through a circuit in Fig. 14n from line 101, contacts C204, j contacts of magnet R587, g contacts of magnet R590 (shifted), cam contacts C162, magnet R233, to line 100.

ENTERING ½ THE DIVISOR INTO THE DIVIDEND ACCUMULATOR

Magnet R214 shifts its a a contacts in Fig. 14f and magnet R233 also shifts its a contacts to prepare circuit paths for entering ½ the divisor into the dividend accumulator.

As indicator in Fig. 15a, magnet R359 is energized just before the beginning of cycle 3, and this is effected through a circuit traceable in Fig. 14h from line 101, contacts C10, k contacts of magnet R587 (shifted), h contacts of magnet R590 (shifted), and magnet R359 to line 100. This magnet closes its a contacts to complete a circuit to magnet R413, through cam contacts C9. Magnet R413 shifts a set of a contacts in Fig. 14f and also a set of b contacts from the positions shown, and through these contacts an impulse will be sent to all the accumulator start magnets 25 at the 9 time to initiate the entry of a 9 in each order.

*9 entry circuits.*—These entry circuits are traceable from line 101 (Fig. 14f), contacts C112, wire 131, thence in parallel through all the a contacts of magnet R413 (shifted), a contacts of magnet R418 (normal) and all twenty Start magnets 25 to line 100.

Referring to Fig. 13, the dividend accumulator contains the complement 99 ... 94685729, and to this value there is to be added in a single cycle of operation the value 99 ... 986284 which represents the 9's complement of ½ the divisor 2743, or in terms of the procedure followed in the mechanism 5 times the divisor.

*Testing for odd digits in the divisor.*—A test is made to ascertain which orders of the divisor setup device contain odd digits of the true divisor value. In Fig. 14d, magnet R178 (now energized) has closed its a contacts wired to the "even" positions wherein brush settings represent the "odd" digits of the true divisor. Thus, in the right hand column the 6 setting represents the true divisor value 3, i. e., an odd divisor digit. The third order from the right also contains such an odd digit of the true divisor. Accordingly, when contacts C160 close at the 9 time in the cycle (which is concurrent with the 9 impulses sent to all the dividend start magnets 25), circuits are traceable from line 101, contacts C160, a contacts of magnet R178 in the 2 and 6 positions, segments 27 and brushes 26 to the first and third conductors 28, a contacts of magnet R603 (normal) to wires 132 (numbered 10 and 8) and enclosed in cable 133 (see Fig. 14f), a contacts numbered 8 and 10 of magnet R233 (now shifted), tabs 87 (first and third from the right and now shifted to engage the first and third wipers 88 from the right), a contacts of magnet R214 (shifted), a contacts of magnet R218 (normal), thence down to the b contacts of magnet R413 (shifted), stop magnets 25 (first and third from the right) to line 100. Impulses to these two magnets occurring simultaneously with the impulses to the corresponding start magnets 25 will result in blocking the clutch operation, and as a consequence the adding wheels in these two orders will not commence rotation but in all other orders the wheels will be clutched for movement.

In Fig. 18 the wheel movements for the ½ divisor entry are diagrammatically represented as vertical lines of varying length. It is here indicated that in all positions but the first and third the wheels start to turn at the 9 time and will be stopped at later differential times. In the first and third orders the rotation is commenced at the 4 time and the controlling circuits are directed through the divisor readout of Fig. 14d.

As a preliminary, relay magnets R418 and R236 are first energized as follows. In Fig. 14n, closure of contacts C163 completes a circuit from line 101, contacts C204, j contacts of magnets R587 (shifted), g contacts of magnet R590 (shifted), contacts C163, and magnets R236 and R418 in parallel to line 100 through wire 107.

Thereafter and at the 4 time in the cycle, contacts C161 (Fig. 14d) close to complete a circuit from line 101, contacts C161, a contacts of magnet R178 in the 2 and 6 positions, to the 8 and 10 wires 132 as before (Fig. 14f), 8 and 10 wires 134 in cables 135 (Fig. 14h), a contacts numbered 8 and 10 of magnet R236 (shifted), first and third tabs 87a (shifted five steps to the right), first and third wipers 88a, a contacts of magnet R225 (normal), wires 136 (numbered 17 and 19) in cable 137 to Fig. 14f, a contacts of magnet R418 (shifted) to the first and third start magnets 25 and line 100.

Thus, the testing of the divisor setting will suppress the initial starting of wheels in orders related to positions containing odd digits of the true divisor and will subsequently cause starting of such wheels at the 4 time, so that all the wheels are now in rotation and the point at which they will be stopped will be controlled by the multiplying drum in accordance with the values of the left hand components of the divisor times 5.

For multiplying by 5, the drum and its contacts are not shifted relatively to one another, as already explained, so that as the drum rotates the contacts are operated at times corresponding to the partial products of 5 times the divisor.

Specifically, in the fifth order from the right a circuit is completed at the 1 time from line 101 (Fig. 14e) through the 2 drum contacts 36L, d contacts 53, a contacts numbered 2 of magnet R190 (normal), wire 138 to the 7 wire 118, brush 26 (set at 7), conductor 28, downwardly to socket 139 (in the fourth column from the right), connection 140 (Fig. 14f) to the fourth socket 141, a contacts of magnet R233 (normal), fourth tab 87, fourth wiper 88, a contacts of magnet R214 (normal), a contacts of magnet R228 (normal) down to the b contacts, fifth from the right of magnet R413 (shifted) to the stop magnet 25 in the fifth order from the right. This stops the related wheel at the 1 time after it has advanced eight steps (see Fig. 18).

In the fourth order, a parallel circuit is completed at the 3 time through the 7 drum contacts 36L to the fourth column stop magnet 25. In the third order a parallel circuit is completed at the 2 time through the 4 drum contacts 36L to the third stop magnet 25 and in the second order a parallel circuit is completed at the 1 time through the 3 drum contacts 36L to the second stop magnet 25.

Relay magnet R413 is deenergized between the 1 and 0 cycle time, so that at the 0 time when contacts C113 (Fig. 14f) close a circuit is completed from line 101, contacts C113, wire 142, all the b contacts of magnet R413 (normal) and all the stop magnets 25 to line 100.

*Tens carry.*—For the example chosen, all orders except the third will have passed through 0 and the third order stands at 9, so that the carry contacts 21, 22 (Fig. 14f) are shifted accordingly and, when contacts C111 close, a circuit is completed from line 101, contacts C111, wire 131, the 10 contacts 22 and then down through the a contacts (normal) of magnets R412, R413, R418 to the start magnets 25 in all orders. In the units order the circuit enters the so-called elusive 1, through the connection 143. One step later, declutching occurs by sending a stop impulse to the stop magnets 25, through the a circuit from line 101, contacts C114, wire 142 and the b contacts of magnets R413.

From Fig. 18, it is thus seen that ½ or 5 times the divisor is added (in complementary form) in a single entry cycle of the accumulator. In prior machines wherein a product is obtained by the formation of left and right hand components, they have either been separately entered into two registers and then added by transfer from one register to the other, or the partial products have been entered into the same register in two successive cycles. In the present case, for multiplication by 5 cognizance is taken of the fact that, when multiplying by 5, all right hand components are either 5 or 0 and the left hand components never exceed 4, so that the total product digit to be entered into any order never exceeds 9.

At the top of Fig. 18 are shown the partial product digits for 5 times 2743, and it is indicated in which accumulator order they are to be entered. From the foregoing circuit explanation, it will have been noted that the right hand component 5 is not obtained from the multiplying drum but is determined by testing the divisor orders for odd digits and, where such occur, the initial 9 impulse is suppressed and a 4 impulse effected to start adding a 5 (complementally). Thereafter, the left hand partial product impulse derived from the multiplying drum stops the advance at times determined by the true components for related orders.

QUOTIENT DIGIT SELECTION

During cycle 2, a selection is made of the first trial quotient digit to determine whether it lies in the "tenths" area of Fig. 17 or in the whole number area. In the present example where the dividend digits 53 are compared with the divisor digits 27, the selection will be 2 located at the junction of the 58 and 28 ordinates in Fig. 17. Where such selection is a whole number, the quotient digit selecting operations during cycle 2 are in effect idle unless the selection is of a "tenths" digit. If during the test a tenths value is selected, it is an indication that the divisor value is greater than the dividend value and the ½ divisor entry should be column shifted, so that rounding off occurs in the proper position.

For the purposes of explaining this operation, let it be assumed that the dividend value in the two highest orders is 25 and the divisor value in the two highest orders is 27. From Fig. 17 the selection will be a quotient digit of .8.

When contacts C213 (Fig. 14g) close in the first cycle, a circuit would be traceable from line 101, contacts C213, j contacts of magnet R596 (shifted), c contacts of magnets R500 and R501 (shifted), c contacts of magnet R502 (normal), d contacts (3) of magnet R512 (normal), a contacts (4) of magnet R549 (shifted) to conductor 28 of the column containing the assumed dividend digit 5 (true value), the brush 26 set at complementary value 4, 5 wire 145 in cable 146 to Fig. 14e, i contacts (5) of magnet R596 (shifted), b contacts (4) of magnet R888 (normal), a contacts (5) of magnet R512 (normal), the 5 wire 117, c contacts (5) of magnet R512 (normal), and number 5 magnet R906 to line 100. This magnet closes its a contacts to hold through contacts C194.

For the initial example, the 3 magnet R906 is energized through a similar parallel circuit representative of the second highest dividend digit 3 as indicated in Fig. 15a.

Contacts C225 (Fig. 14n) now close to energize magnet R512 a second time through a circuit from line 100, wire 107, magnet R512, contacts C225, and a contacts of magnet R607 (shifted) to line 101. Contacts C214 (Fig. 14g) thereafter close to complete a circuit from line 101, contacts C214, j contacts of magnet R596 (shifted), c contacts of magnets R500 and R501 (shifted), c contacts of magnet R502 (normal), d contacts (3) of magnet R512 (shifted), a contacts (3) of magnet R549 (shifted), to the conductor 28 in the column containing the highest dividend digit (assumed) 2, the brush 26 set at complementary value 7, 2 wire 145 in cable 146 to Fig. 14e, i contacts of magnet R596 (shifted), b contacts of magnet R888 (normal), a contacts of magnet R512 (2) (shifted), 2 wire 119 in cable 120 (Fig. 14i), c contacts of 5 magnet R906 (shifted), a contacts of magnet R888 (normal), the 25 wire 149 in a cable 150 (which contains twenty-three wires 149, each of which extends to a pair of related b contacts of all of the twenty-three magnets R810, Figs. 14i, 14j and 14k).

Since the 28 magnet R810 is now energized (representative of the divisor selection), the circuit continues through cable 150 (second horizontal branch from the bottom) to Fig. 14k, the 25 wire 149, the b contacts (25) of magnet R810 numbered 28, the .8 wire of a group generally designated 152 (Figs. 14j and 14i and back to Fig. 14k), then to Fig. 14m, the .8 winding of a magnet designated R8 to line 100. Magnet R8 closes its d contacts, so that the circuit branches therethrough to wire 153 and a so-called "tenths" magnet R552 to line 100. This magnet R552 closes its *b* contacts to hold from line 100, magnet R552, its *b* contacts, wire 154 (Fig. 14n), contacts C231, C220, *b* contacts of magnet R596 and wire 106 to line 101.

Magnet R8 also closes its *c* contacts (Fig. 14m) to set up a holding circuit through its 8 winding traceable from line 100, 8 winding of magnet R8, its *c* contacts, wire 154 to Fig. 14n to line 101, as already traced.

Where, as in the initial problem the dividend digits are 53, the quotient digit selecting circuit extends through the 2 wire 152 (Fig. 14k) directly to the 2 winding of magnet R2 and line 100, closing its *c* contacts to set up a holding circuit. In such case, however, no circuit will extend to the tenths magnet R552, so that it may be generally stated that when a tenths quotient digit is selected, magnets R1 to R9 are selectively energized with accompanying energization of magnet R552. When a non-decimal quotient digit is selected, magnets R1 to R9 are selectively energized without accompanying energization of magnet R552.

In Fig. 14b magnet R552 shifts its *a* contacts and a circuit is completed at the time contacts C207 close to energize the 7 magnet R141 along with the 1 to 6 magnets as already explained.

Magnet R552 is energized and held for the period indicated at the bottom of Fig. 15a. As also indicated, the 1 to 7 magnets R141 are energized with the circuit for the 7 magnet traceable in Fig. 14b from line 101, contacts C207, *b* contacts of magnet R501, *a* contacts numbered 3 of magnet R552 (shifted), *b* contacts numbered 3 of magnet R546 (shifted), *a* contacts of magnet R525 numbered 8 (shifted), *a* contacts of magnet R530 numbered 7 (shifted), thence serially through the contacts of magnets R533 and R536 and R539, to the 7 magnet R141, to line 101, through wire 122. Shortly thereafter, when contacts C166 (Fig. 14a) close, a circuit extends from line 101, *z* contacts of magnet R596, contacts C166, wire 126 in parallel through the *b* contacts of the magnets R141 numbered 1 to 7 (now shifted), thence through the connected *d* contacts of magnet R569 (shifted), to energize the magnets R566 numbered 1 to 7. These will set up their holding circuits as already traced. Now, when contacts C189 close, a circuit is traceable from line 101, contacts C189, *d* contacts numbered 11 of magnet R563 (shifted), the In socket 104, connection 103, the 3 socket 104, and thence through the contact network of which contacts for the 1 to 7 magnets R566 are shifted to the *d* contacts numbered 10 of magnet R563, the 10 wire 128, cable 129 (Fig. 14b), the 10 magnet R141 and wire 122 to line 100.

Referring now to Fig. 14d, the selecting circuits for magnet 73 will follow substantially the same circuit path as previously traced, i. e., the 1 magnet 73 will be energized through a circuit from line 100, the 1 magnets 73, contacts C84, the *f* contacts of the 10 magnet R141, wire 130 to line 101 as before. In Fig. 14n a circuit is traceable to energize magnet R214 as before through a different path which is traceable from line 101, contacts C204, *j* contacts of magnet R587 (shifted), *f* contacts of magnet R590 (shifted), *a* contacts of the 10 magnet R141 (now shifted) and magnet R214 to line. This magnet will set up its holding circuit as before and will serve to shift its contacts in Fig. 14f to initially direct the entry into the dividend accumulator as represented in Fig. 13.

Before such entries are effected, however, a further circuit is traceable to energize magnet R608 (Fig. 14n) which is traceable from line 101, contacts C204, *j* contacts of magnet R587, *g* contacts of magnet R590, *b* contacts of the 10 magnet R141 and magnet R608 to line 100. This magnet closes its *b* contacts to provide a holding circuit through contacts C168 which together with contacts C204 maintain the magnet energized for the period indicated near the bottom of Fig. 15a, that is, throughout the entering portion of cycle 3. Magnet R608 shifts a set of *a* contacts in Fig. 14d which are wired to the conductors 28 of the divisor setup device. An inspection of the arrangement will show that with magnet R608 energized, the entries will be shifted one column or position to the right so that 5 times the divisor will be entered into the dividend accumulator in the following relationship:

```
9 9 - - - - 4 6 8 5 7 2 9
9 9 - - - - 9 9 9 8 6 2 8
─────────────────────────
9 9 - - - 9 4 6 8 4 3 5 8
```

In this manner, when the selection of the trial quotient digit involves a tenths value, there is a column shift effected by the magnet R608 to adjust the entry of the half divisor for rounding off in the proper order.

CYCLE 4

At the beginning of this cycle, the so-called corrected dividend 5327985 stands in the dividend accumulator as the 9's complement 99...94672014 and a comparison is made between the two highest digits 53 thereof and the two highest digits 27 of the divisor to select the trial quotient digit 2 according to the table of Fig. 17.

From Fig. 15a it is seen that magnet R607 is first energized and held as for cycle 2 followed by energization of magnet R518 when contacts C223 close. Since the number of 0's (complementary 9's) at the left is still the same as during cycle 2, the magnets R500, R501, R546 and R549 are again energized as indicated and R509 is also energized after R546 and R549 have been picked up.

With the energization of magnet R512 to shift its *a* contacts in Fig. 14e, the circuits are directed through cable 120 (Fig. 14i) from which a circuit extends through the *b* (58) contacts of the 28 magnet R310 (Fig. 14k) representative of the two highest divisor digits to the 2 wire 152 to energize the 2 winding of the quotient digit magnet R2 of Fig. 14m. Magnets R141 numbered 1, 2, 3, 4, 5 and 6 are also energized as before. Thus far, there is a repetition of the circuits as traced for cycle 2 for the purpose of setting up magnets representing the two highest digits in the factors and selecting the appropriate trial quotient digit 2.

Magnet R560 (Fig. 14n) is not picked up in this cycle since magnet R605 is continuously held and its *a* contacts remain open. Therefore, magnet R563 is not picked up and magnet R590 also remains deenergized. Accordingly, when contacts C202 close, a circuit is completed from line 101, contacts C202, *c* contacts of magnet R596 (shifted), *b* contacts of magnet R602, *b* contacts of magnet R607 (shifted), *d* contacts of magnet R1 (normal), *a* contacts of magnet R590 (normal) and magnet R584 to line 100, through wire 107. Thus, at this point in the cycle magnet R584 is energized instead of magnet R587 and is held through its *c* contacts and contacts C201.

Magnet R584 closes its *h* contacts (Fig. 14n) to complete the circuit from line 101, contacts C27, *h* contacts of magnet R584 and the drum clutch magnets 30 to line 100. The multiplying drum will now make another half revolution during the following cycle 5. It will be recalled that a first ½ revolution was effected during cycle 3, so that now the alternating contacts 53 (Fig. 14e) are in shifted position (i. e. contacts c and b are closed and contacts a and d are open). Also, the 36L contacts read the right hand partial product holes and 36R contacts read the left hand partial product holes.

Before the drum contacts 36L and 36R engage the drum holes, a shift occurs to effect the relative relationship of the drum and contacts appropriate for multiplying by 2.

Magnet R2, when energized, sets up a holding circuit traceable from line 100 (Fig. 14m), magnet R2, its c contacts, wire 154 (Fig. 14n), contacts C231, contacts C220, b contacts of magnet R596 and wire 106 to line 101. Before contacts C231 open, the magnet R584 is energized as explained and its b contacts provide a shunt around contacts C231 so that magnet R2 remains energized for the period indicated in Figs. 15a—15b. This circuit follows from wire 154 (Fig. 14n), b contacts of magnet R584 (shifted), c contacts of magnet R590 (normal), contacts C220 to line 101 as before.

In Fig. 14c, when contacts C192 close near the end of cycle 4, a circuit is traceable from line 101, contacts C192, wire 155, a contacts of magnet R2 (now closed), and magnet 52L to line 100. This will position the contacts for multiplying by 2.

For the other quotient digits, magnets 52L, 52R, 40L and 40R will be energized as follows, through the related a contacts of magnets R1 to R9.

| Quotient Digit | Magnets Energized Through C192 | | |
|---|---|---|---|
| 1 | R158 | 52L | 40R |
| 2 | | 52L | |
| 3 | R157 | 52L | 40L |
| 4 | | | 40R |
| 5 | | None | |
| 6 | | | 40L |
| 7 | R157 | 52R | 40R |
| 8 | | 52R | |
| 9 | R158 | 52R | 40L |

It is to be noted that for the even digits, magnets 40 and 52 are directly energized and for the odd digits a magnet R157 or R158 is energized and the circuits branch through the a contacts of these magnets. This arrangement is to prevent possible back circuits.

CYCLE 5

In this cycle the left hand partial products of 2 times the divisor 2743 are to be entered directly in their true value into the dividend accumulator as represented in Fig. 13. As a preliminary, the magnet R412 is energized to direct the impulses from the multiplying drum to the start magnets 25. In Fig. 14h closure of contacts C10 completes a circuit from line 101, contacts C10, d contacts of magnet R584 (shifted), h contacts of magnet R590 (normal), c contacts of magnet R593 (normal), and magnet R358 to line 100. Thus, when contacts C9 close later, there is a circuit from line 101, contacts C9, a contacts of magnet R358 (shifted) and magnet R412 to line 100. Magnet R412 shifts its a contacts in Fig. 14f.

From Fig. 13, it is seen that only the digit 1 is to be entered in the seventh column from the right, as the left hand digit of 2 times 7, and this circuit is traceable at the 1 time in the cycle as follows in Fig. 14e: from line 101, contacts 36R in the 7 position, c contacts 53 (now shifted), a contacts of magnet R190 (normal), wire 138, 2 wire 118, brush 26 in the third column from the right, conductor 28, socket 139, connection 140 (Fig. 14f) to socket 141 (third from the right), a contacts of magnet R233 (normal), 3 tab 87, 6 wiper 88, a contacts of magnet R214 (normal), a contacts of magnet R228 (normal), a contacts of magnet R412 (shifted, seventh from the right), and thence down through the normal a contacts of magnets R413 and R418 to the start magnet 25 (seventh from the left) and line 100.

The relative positioning of tabs 87 and wipers 88 involved a two-step shift to the right, brought about as follows. In Fig. 14d with magnets R141 numbered 1 to 6 energized (the 9 magnet 141 is not energized now), a circuit is traceable from line 100, the 2 magnets 73, f contacts of the 6 magnet R141 (shifted) serially through the f contacts of the 7, 8, 9, and 10 magnets R141 (normal), wire 130 (Fig. 14b), contacts C82, g contacts of magnet R584 (shifted), g contacts of magnet R596 (shifted), wire 124 (Fig. 14n), a contacts of magnet R584 (shifted), contacts C220, b contacts of magnet R596 (shifted), and wire 106 to line 101.

Thus, the left hand digit 1 commences entry into the dividend accumulator. After one step of advance, the stop circuit is completed through contacts C113 (Fig. 14f) to energize all the stop magnets 25 as before, leaving the wheel into which the 1 was entered advanced one step. No tens carries are involved, so that tens carry circuits are ineffective at this time and at end of the cycle the setting of the accumulator is 99 . . . 995672014 as indicated in Fig. 13.

CYCLE 6

Figure 15B:
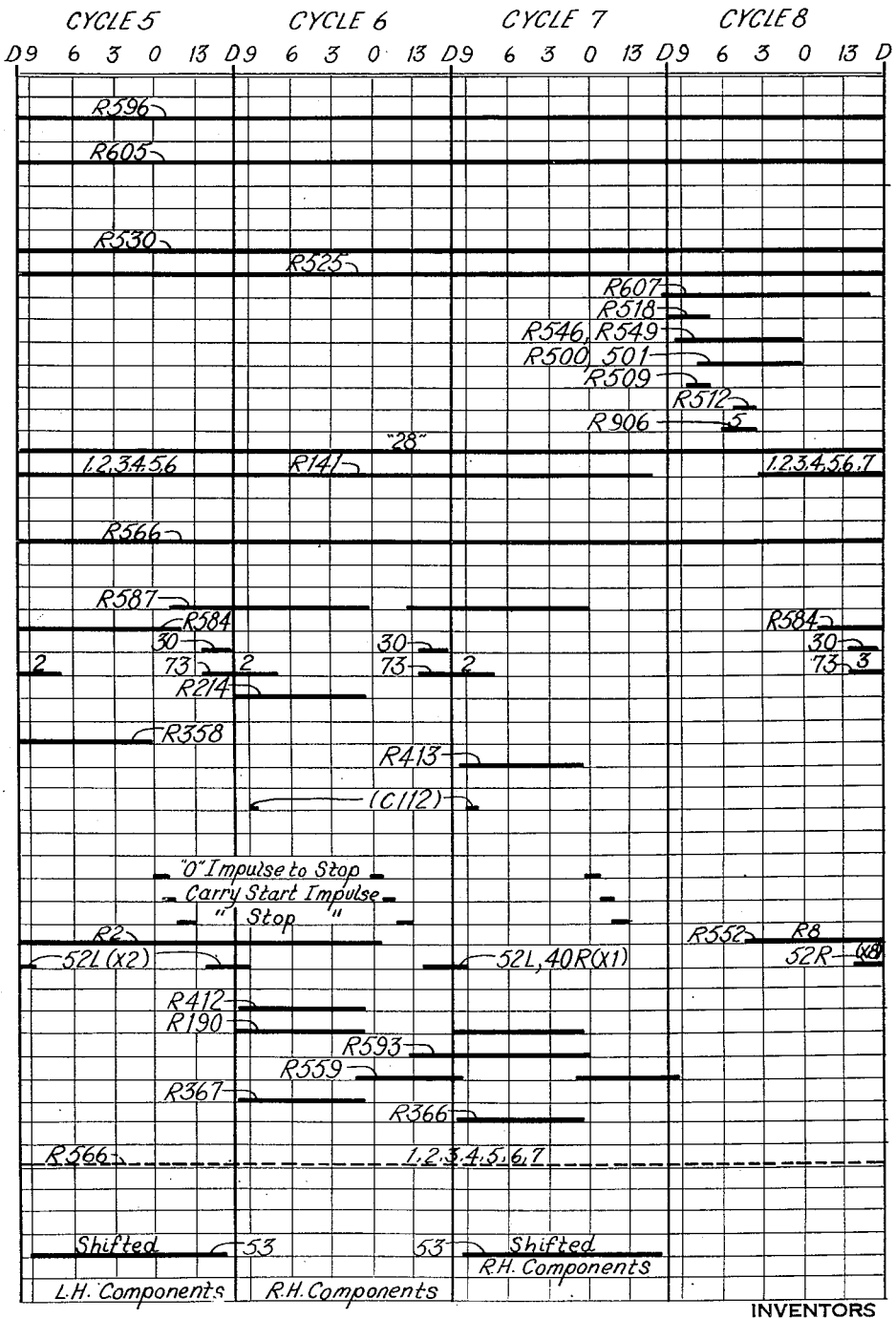

*Entry of right hand component.*—From Figs. 15b and 14n it is seen that magnet R587 is again energized near the end of cycle 5, and through its f contacts the drum clutch magnet 30 is operated to effect another half revolution, during which the value 4486 is entered into the dividend accumulator as indicated in Fig. 13. The magnet R412 is energized as before, and in addition magnet R214 is energized to effect a one step entry shift to the right. Its energizing circuit is traceable from line 101 (Fig. 14n), contacts C204, j contacts of magnet R587 (shifted), f contacts of magnet R590 (normal), and magnet R214 to line 100 through wire 107. Magnet R214 shifts its a contacts in Fig. 14f. Magnet R190 is energized in parallel therewith from j contacts of magnet R587 and g contacts of magnet R590 (normal).

Tracing a representative entry circuit, for example, the one through which the 6 (right hand digit of the product of 2 times 3) is entered, it follows from line 101 (Fig. 14e) at the 6 time in the cycle, through the 3 contacts 36R, a contacts 53 (normal), a contacts of magnet R190 (shifted), wire 138, 6 wire 118, brush 26 (set at 6), conductor 28, right hand socket 139, connection 140 (Fig. 14f), a contacts of magnet R233 (normal), right hand tab 87, number 4 wiper 88, a contacts of magnet R214 (shifted), a contacts of magnet R218 (normal), a contacts of magnet R412 (shifted), and thence down through the a contacts of magnets R413 and R418 to the start magnet 25 fourth from the right, to enter a 6 in the related order.

Through similar parallel circuits, entries are also made in the three higher orders and at the 0 time the stop magnets 25 are energized through contacts C113 as before. During the carry time the elusive 1 is entered into the units order, since then there is a carry through the highest order and the accumulator stands at 158015 at the end of this cycle with a 0 setting in the highest order.

The presence of a 0 setting in such highest order is indicative of an "overdraft" condition which is tested for upon closure of contacts C196 closing near the end of the cycle to complete a circuit from line 101 (Fig. 14g), contacts C196, m contacts of magnet R559 (shifted as will presently be explained), conductor 28 in the highest order, brush 26 (set at 0), n contacts of magnet R596 (shifted), and magnet R593 and in parallel through a winding of magnet R587 to line 100. Magnet R593 closes its a contacts to provide a holding circuit through contacts C195 for the period indicated in Fig. 15b, cycles 6 and 7. Magnet R559 was energized following the first energization of magnet R587 through a circuit traceable in Fig. 14n from line 101, wire 106, contacts C197, e contacts of magnet R587, and magnet R559 to line 100, holding through contact C198.

QUOTIENT DIGIT ENTERING CIRCUITS

During cycle 6, as seen from Fig. 13, the first trial quotient digit 2 is to be entered in the form of a 9's complement in the fourth order of the quotient accumulator and 9's are to be entered in the remaining orders. Magnet R367 is energized during the entering portion of this cycle as indicated in Fig. 15b so that, when contacts C112a (Fig. 14c) close at the 9 time, impulses are transmitted from line 101, through the a contacts of magnet R367 (shifted), to all the start magnets 25 of the quotient accumulator.

In the fourth order, a stop impulse is transmitted at the 2 time and is traceable from line 101 (Fig. 14d), cam contacts C103, b contacts of magnet R2 (shifted), h contacts of magnet R587 (shifted), wire 157 (Fig. 14c), g contacts of the 9, 8, 7 magnet R141 (normal), g contacts of the 6 magnet (shifted), b contacts of magnet R367 (shifted) to the stop magnet 25 in the fourth position to line 100. At the 0 time in the cycle, the usual stop impulse is transmitted to the remaining stop magnets through contacts C113a and the b contacts of magnet R367 which are back in normal position at such time. At the carry time, the usual tens transfer takes place and through connection 160 (Fig. 14c) there is a high-to-low-order carry to enter the elusive 1 in the units order as indicated in Fig. 13. Thus, at the end of cycle 6 the accumulators contain the entries as shown in Fig. 13 and there has been an indication of an overdraft which will cause 1 times the divisor to be entered subtractively in the dividend accumulator and a 1 to be entered additively in the quotient accumulator during the seventh cycle.

CYCLE 7

Near the end of cycle 6, the drum clutch magnet 30 is again energized through the f contacts of magnet R587 (Fig. 14n), and a relative adjustment between the multiplying drum and the shifting contacts is effected for multiplying by 1. This involves energization of magnets 52L and 40R (Fig. 14c). The magnet R593 has closed a pair of b contacts wired in parallel with a contacts of magnet R1 so that, when contacts C192 close, a circuit is completed from line 101, contacts C192, wire 155, b contacts of magnet R593, magnet R158 to line. This magnet closes its a contacts so that circuits branch to the magnets 40R and 52L and, as the drum rotates during cycle 7, the product of 1 times the divisor will be read out and, of course, there will be no left hand partial products.

Again, as a preliminary, the dividend accumulator must be conditioned for receiving the entry and this is done by energizing magnet R413 through the familiar circuits traced on Fig. 14h. The entering circuits will, therefore, follow from line 101 in Fig. 14e, through the contacts 36L, the alternating contacts 53 in their shifted position, the a contacts of magnet R199 in their shifted position, thence through the wires 138 and the divisor setup device to the plug sockets 139 and connections 140 to Fig. 14f, where the circuits continue through the a contacts of magnet R233 (normal), the column shift tabs 87 and wipers 88 (shifted two steps), thence through contacts of magnet R214 (normal), a contacts of magnet R228 (normal), b contacts of magnet R413 (shifted), to the stop magnets 25. Prior to the completion of these circuits through the divisor setup device, the usual hot 9 impulses are sent to the start magnets in all orders, through the contacts C112.

Referring to Fig. 14n, the magnet R199 is energized upon closure of contacts C204, through a circuit from line 101, contacts C204, j contacts of magnet R587 (shifted), g contacts of magnet R599 (normal), and magnet R199 to line, through wire 107. In this manner magnet R199 is energized whenever the magnet R587 is energized, provided the magnet R599 is not.

In the quotient accumulator, a 1 is to be directly entered into the fourth position (Fig. 13), and this is effected through a circuit traceable in Fig. 14d from line 101, contacts C102 (which close at the 1 time), d contacts of magnet R593 (shifted), h contacts of magnet R587, wire 157 (Fig. 14c), thence through the g contacts of the 9, 8, and 7 magnets R141 (normal), the g contacts of the 6 magnet (shifted), a contacts of magnet R366 (shifted), a contacts of magnet R367 (normal) to the start magnet 25 in the fourth order. The magnet R366 is shown in Fig. 14h and was energized at the beginning of cycle 7 as indicated in Fig. 15b, through a circuit from line 101, contacts C9, m contacts of magnet R587, m contacts of magnet R599 (normal), c contacts of magnet R593 (shifted), r contacts of magnet R596 (shifted), to magnet R366 and then to line 100. Thus, at the end of cycle 7, the dividend accumulator contains the value 99 . . . 97415014 and the quotient accumulator contains the value 99 . . . 98999.

CYCLE 8

The operations during the following cycles 8, 9 and 10 are repetitions of the operations occurring in cycles 4, 5 and 6, i. e., the two highest digits of the new or remaining dividend are compared with the two highest digits of the divisor to select a new trial quotient and left and right hand components are obtained and successively subtracted from the dividend. This new trial quotient is 8 tenths and the operations involved are as follows. From the sequence chart it is noted that magnet R507 is again energized which will bring about energization of magnet R518 as for cycle 4. Also, magnets R546, R549, R500 and R501 are again energized due to the fact that the dividend accumulator contains the same number of 9 settings as it did during cycle 4. The magnet R906 which is energized in this cycle is the one numbered 5 in response to the circuit passing through the position of the dividend accumulator in which the second highest digit of the new dividend stands. This digit is 5 (true value).

With the 5 magnet R906 energized, a circuit is completed when contacts C214 (Fig. 14g) close through the now familiar circuit path to the common conductor 28 of the dividend accumulator containing the highest significant digit which is 7 (complement), and from here the circuit extends through the 2 wire 145 in cable 146 (to Fig. 14e), i contacts of magnet R596 (shifted), b contacts of magnet R888 (normal), a contacts of magnet R512 (shifted), to the 2 wire 119 in cable 120 extending to Fig. 14i where the circuit continues through the 2 wire 119, c contacts of the 5 magnet R906, a contacts of magnet R888 (normal) to the 25 wire 149 in cable 150, which extends through its second branch from the bottom across Figs. 14j to 14k, where the 25 wire 149 passes through b contacts of the 28 magnet R810 (shifted), to the .8 wire 152. From here the circuit ultimately extends to magnet R8 (Fig. 14m) and to line 100, and branches through the d contacts of the magnet to also energize the so-called tenths relay magnet R552 as already explained. Magnet R8 closes its a contacts in Fig. 14c to energize the magnet 52R which will effect a shifting of the drum contacts to a position appropriate for reading out partial products for the digit 8. As noted in Figs. 15b and 15c, the magnets R141 numbered 1 to 7 are to be energized in Fig. 14b. The circuits involved are as already traced in connection with cycle 2.

As explained in connection with cycle 2, the first six magnets R141 are energized in accordance with the number of 9's set up in the divisor and dividend accumulators, while the number 7 magnet is energized as a result of the operation of the tenths relay magnet R552. In Fig. 14d, the 3 column shift magnet 73 will now be energized through a circuit from line 100, the 3 magnets 73, the f contacts of the 7 magnet R141 (shifted), and the f contacts of the 8, 9 and 10 magnets R141 (normal) to wire 130 and line 101 as already traced. Consequently, when the drum clutch 30 is again energized near the end of cycle 8, through the h contacts of magnet R584 (Fig. 14n), the column shift tabs 87 of Fig. 14f will be shifted three steps toward the right to align the circuits for correct allocation of the left hand and right hand partial products of 8 times the divisor. Just prior to this, the magnet R584 is reenergized in the same manner as explained for cycle 4.

CYCLE 9

In this cycle, magnet R412 is again energized as previously explained to condition the entry circuits so that the partial product impulses will be directed to the start magnets 25. Such impulses will flow during the cycle through the contacts 36L (Fig. 14e) and the normally closed d contacts of the alternating group 53, through circuit paths which are now familiar, so that they are not repeated here.

After the entering period of the cycle, magnet R587 is energized and magnet R584 is deenergized, and near the end of the cycle the drum clutch magnet 30 is picked up again as well as the number 3 column shift magnets 73 and the drum contact positioning magnet 52R.

CYCLE 10

Figure 15C:
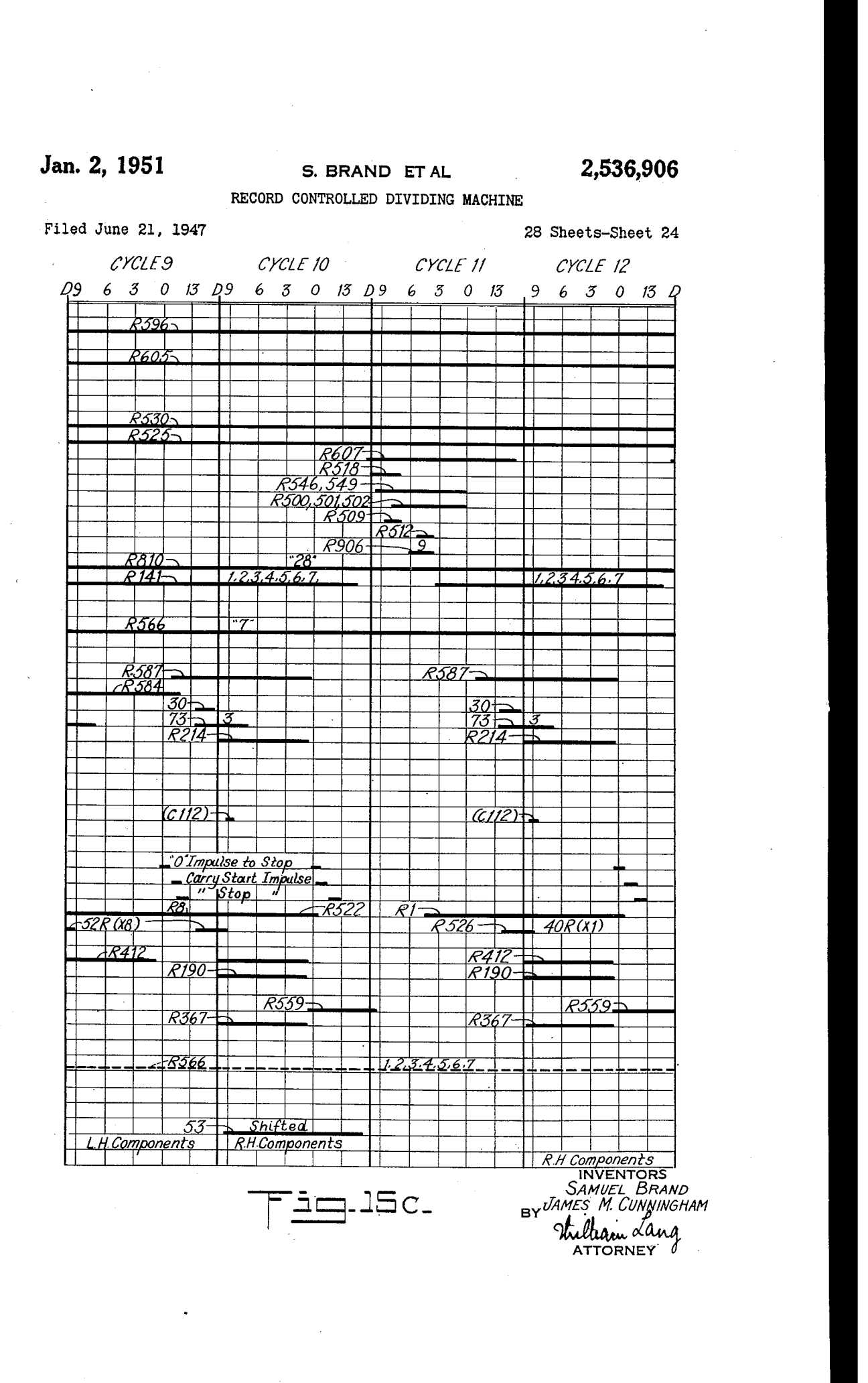
Figure 15A:
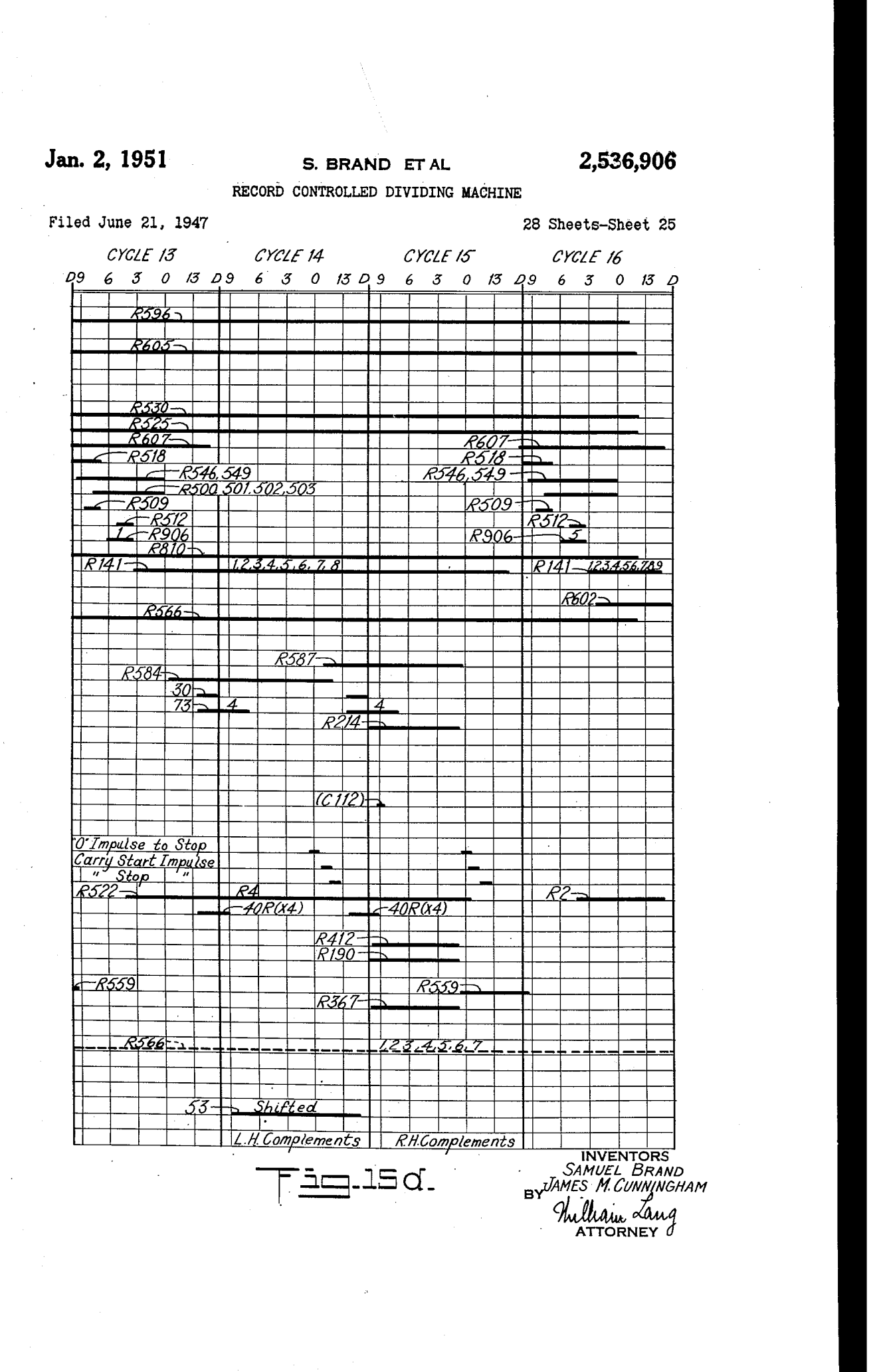

At the beginning of this cycle, magnet R412 is again energized to condition the entering circuits to receive the right hand partial product impulses and concurrently as explained for cycle 6 the magnets R199, R367 and R214 are energized as indicated in Fig. 15c. During this cycle, the right hand partial product impulses extend through the contacts 36L (Fig. 14e), the b contacts of the 53 set which are now shifted and the a contacts of magnet R199, thence through the divisor setup device and plugging connections 140 to Fig. 14f, where they are directed to the start magnets 25 to enter the right hand partial products in the positions indicated in Fig. 13.

During the same cycle, the digit 8 is subtractively entered into the quotient accumulator by initially energizing the start magnets at the 9 time and in the third order stopping it at the 8 time. This stopping circuit is traceable as follows: from line 101 (Fig. 14d), contacts C100 timed to close at 3, the b contacts of magnet R3 (shifted), h contacts of magnet R587, wire 157 (Fig. 14c), g contacts of the 9 and 8 magnets R141 (normal), g contacts of the 7 magnet R141 (shifted), a contacts of magnet R367 (shifted) to the stop magnet 25 in the third order from the right, to line 100. At the end of cycle 10, therefore, the dividend accumulator stands at 99 . . . 99609414 and the quotient accumulator stands at 9999998199.

CYCLE 11

This is another test cycle in which operations similar to those explained for cycle 8 take place. Specifically, the magnets R607, R518, R546, R549, R500 are energized as before. The magnet R502 is now energized in addition to magnets R500 and R501, because the dividend accumulator now contains an additional 9 at the left, and through the circuits explained and in accordance with table No. 2 hereinabove the present condition, wherein there are 14 9's at the left, calls for energization of magnets R500, R501, R502, R546 and R549. With these magnets energized, the magnet R906 numbered 9 is energized through a circuit similar to that previously traced for the other R906 magnets, except that it is directed through the 9 magnet R906 which corresponds to the true value in the second highest order of the dividend.

The succeeding quotient digit selecting circuit thereafter passing through the setting in the highest dividend position will thereafter extend through the R1 magnet of Fig. 14m. This circuit is traceable as follows: from line 101 (Fig. 14g), contacts C214, j contacts of magnet R596, c contacts of magnets R500, R501 and R502 in series (shifted), c contacts of magnet R503 (normal), d contacts numbered 4 of magnet R512 (shifted), a contacts of magnet R549 numbered 4 (shifted), to the conductor 28 in the sixth column from the right now set at 6, thence to the 3 wire 145, cable 146 (Fig. 14e), i contacts of magnet R596 (shifted), b contacts of magnet R888 (normal), a contacts of magnet R512 (shifted) to the 3 wire 119 in cable 120 (Figs. 14i and 14j), where the 3 wire 119 extends through the d contacts of the 9 magnet R906, a contacts of magnet R888 (normal) to the 42 wire 149 in cable 150 which extends to Fig. 14k, where the wire passes through the b contacts in the 28 magnet R810 to the 1 wire 152 and from there to the magnet R1 and line 100.

Referring now to Fig. 14b, with the magnets R500, R501 and R502 energized, circuits will be completed when contacts C207 close to energize the number 1 to 7 magnets R141, so that these magnets are energized and held through cycle 12 as indicated in Fig. 15c. Near the end of cycle 11, magnet R587 is energized upon closure of contacts C202 in Fig. 14n, through familiar circuits, and as a result the drum clutch magnet 30 is also energized. Column shift magnets 73 numbered 3 are again energized through the circuit as explained for cycle 10 to direct the partial product entries as indicated in Fig. 13. The drum and drum contact relative shift is effective for multiplying by the digit 1. From Fig. 14c it is noted that closure of contacts C192 results in the initial energization of magnet R158 followed by circuits through its a contacts to energize magnet 52L and 40R which is appropriate for multiplying by 1.

Referring to Fig. 14n, it will be noted that the d contacts of magnet R1 in normal position enable magnet R584 to be normally energized during a test cycle, such as explained in connection with cycle 8. Where, however, magnet R1 is energized as a sign that the trial quotient digit is 1, the d contacts in Fig. 14n are shifted so that the circuit is directed to magnet R587 instead of magnet R584. As a result, entry of the right hand components, which in the case of multiplying by 1 is the complete product, occurs in the cycle following the test cycle, i. e., the left hand entry cycle is skipped or omitted.

CYCLE 12

At the beginning of this cycle, the magnets R412, R190 and R367 are energized and the alternating contacts 53 are in their normal position, so that as the multiplying drum turns through its half revolution the product impulses are transmitted through the contacts 36R and directed to a dividend accumulator entering the value 2743 in the orders indicated in Fig. 13. During the same cycle, a 1 is entered complementarily into the quotient accumulator. The quotient accumulator start magnets are energized at the 9 time, and in the third order from the right an impulse is transmitted at the 1 time to interrupt the advance of this order after 8 steps. This stop circuit is traceable in Fig. 14d from line 101, contacts C102, b contacts of magnet R1, h contacts of magnet R587, wire 157 (Fig. 14c), g contacts of the 8 and 9 magnets R141, g contacts of the 7 magnet (shifted), b contacts of magnet R367 (shifted) to the stop magnet 25 in the third position, and thence to line 100. After the tens carry part of the cycle, the dividend accumulator contains the setting 99 . . . 883714, the quotient accumulator contains the value 9999998099 and the machine is in readiness to go through another test cycle.

CYCLE 13

From Fig. 15d it is seen that the operations are repeated as for cycle 11 in that the magnets R607, R518, R546, R549, R509, R500, R501, R502 are energized as before, since the number of 9's standing in the dividend accumulator is the same as during cycle 11. As indicated in Fig. 15d, the 1 magnet R906 is energized during this cycle in correspondence with the true value 1 of the second highest digit of the dividend whose complement 8 is now standing in the accumulator. Magnet R512 is also energized as before and, as indicated in the sequence chart, the quotient digit magnet R4 will now be energized with accompanying energization of magnet R552, since the energizing circuit will extend through the .4 wire 152. The magnets R141 thereafter energized are numbered 1 to 8, since as explained the energization of magnet R552 causes an additional magnet R141 to become energized. When contacts C202 in Fig. 14n close, the magnet R584 will be energized as explained for cycle 8 and thereafter the drum clutch magnet 30 is energized and the number 4 column shift magnets 73 of Fig. 14d are energized through the now shifted f contacts of the 8 magnet R141. Also, in Fig. 14c, when contacts C192 close, a circuit is completed through the a contacts of magnet R4 to effect a drum shift appropriate for multiplying by the digit 4.

CYCLE 14

During this cycle, the left hand partial product impulses extend through the contacts 36R in Fig. 14e and the contacts 53 in shifted position to enter the value 211 in the dividend accumulator as indicated in Fig. 13.

CYCLE 15

Near the end of cycle 14, the drum clutch magnet 30 and the number 4 column shift magnets 73 as well as the magnets 40R are again energized as indicated on the sequence chart, and the magnet R587 is also picked up. Then, at the beginning of cycle 15 the magnets R412, R367 and R214 are energized as well as magnet R199 to effect in the now familiar manner entry of the right hand component 8862 into the dividend accumulator and entry of 4 as a complement into the quotient accumulator. At the end of this cycle, the dividend accumulator contains the complement of the remainder 6565 and the complement of the quotient 194 is contained in the quotient accumulator.

CYCLE 16

In this cycle as indicated in Fig. 15d, the magnets R607, R518, R546, R549, R509, R500, R501, R502, R503 are again energized as before. The 5 magnet R906 is energized since the true value of the second highest dividend digit is 5 and again the magnet R512 is energized. Thereafter, the quotient digit magnet R2 is energized as a result of the comparison of the dividend value 65 and the divisor value 27 for the two highest positions of the factors. Since the additional magnet R503 is now energized in response to the presence of an additional 9 in the dividend accumulator, circuits in Fig. 14b will cause energization of magnets R141 numbered 1 to 9.

Referring to Fig. 14a, with the 9 magnets R141 energized, a circuit is completed when contacts C166 close, which is traceable from line 101, the z contacts of magnet R596, contacts C166, wire 126, the b contacts of the 9 magnet R141, d contacts of magnet R560 (normal), d contacts numbered 9 of magnet R593 (normal), thence downwardly through the b contacts of the 1 to 6 magnets R566 (shifted), and then through the contacts of the 7 magnet R566 (normal) to the 3 socket 104, connection 103, to the In socket 104, d contacts numbered 11 of magnet R563 (normal), e contacts of magnet R560, d contacts of magnet R590, e contacts of magnet R9, d contacts of magnet R607 (shifted), magnet R602 to line 100. Magnet R602 closes its f contacts to hold through contacts C199 for the period indicated in Fig. 15d.

In Fig. 14h, magnet R602 opens its a contacts to break the holding circuit for magnet R596, so that when contacts C155 open the magnet will be deenergized. In Fig. 14n deenergization of magnet R596 opens its b contacts so that in turn magnet R605 becomes deenergized. Magnet R596 opens its z contacts in Fig. 14a to deenergize the magnets R566 when contacts C149 open. In Fig. 14m, the magnet R602 closes a pair of g contacts to provide a temporary shunt around y contacts of magnet R596 so that, when the latter open, the holding circuit for the magnets R810 is held for a short period until contacts C199b open. With the various magnets deenergized as explained, the apparatus will come to rest at the end of cycle 16 with the values standing in the accumulators as shown in Fig. 13.

The quotient 1940 is thus obtained which is correct to three places rounded off. If the plug connection 103 (Fig. 14a) had been made to the 4 socket 104, a further computing step would have occurred to obtain the quotient 1937 correct to four places rounded off, although in such case since the actual fifth place is a 3, the fourth place is not raised a unit.

Similarly, if connection 103 had been made to the 2 socket 104, the operation would have terminated with the quotient 1900, and if the connection had been made to the 1 socket 104, the quotient would have been 2000, i. e., correct to 1 place rounded off.

The resulting quotient is evidenced by the setting of brushes 26 on the so-called readout device of Fig. 14c from which a manifesting device, such as a punch or printer, may be controlled through known circuits which are omitted for the sake of simplification of the wiring diagram. Also omitted from the circuit are the automatic resetting circuits, since it may be assumed that after the quotient has been obtained the accumulator wheels may be manually rotated to their initial 9 settings in readiness to handle another problem.

RECAPITULATION

Briefly reviewing the dividing operation in connection with the sequence diagram, the dividend and divisor are first entered into their respective accumulators as 9's complements with the dividend located to follow the rule that a number of orders to its right are skipped, equal to the sum of the decimal places in the dividend and quotient. A plug connection 103 is made (Fig. 14a) in accordance with the number of quotient places to which the computation is to be carried out.

Automatic operations are then started and, after preliminary energization of magnets R596, R560 and R888, the factor magnitudes are ascertained to selectively energize magnets such as R530 and R525 for the divisor and R546 and R509 for the dividend, of which the former set will remain energized throughout computing operations and cause energization of the appropriate R810 magnet of the quotient digit selecting network.

Column shift magnets R141 are then energized to direct the half divisor into the appropriate dividend accumulator orders. Such selection may be modified as a result of a preliminary quotient digit selection and, if the test indicates that the first digit has a "tenths" value the half divisor entry is shifted one step to the right. The dividend accumulator is then conditioned to receive an entry and in cycle 3 a value representing ½ the divisor is added to the dividend with the result (which may be termed the corrected dividend) represented as a 9's complement.

In cycle 4, the quotient digit selection is repeated and the circuits adjusted so that in the following cycles 5 and 6 the LH and RH components are entered additively and in succession with magnet R214 acting in cycle 5 to effect a one step shift of the entry. Also in cycle 5, the circuits for the quotient accumulator are prepared to effect entry of the quotient digit (subtractively) into the quotient accumulator and in the appropriate order thereof.

In cycle 6, it is detected through energization of magnet R593 that an overdraft has occurred and as a result in cycle 7 the divisor is subtracted from the dividend and the quotient digit is reduced by 1.

In cycle 8, the test is repeated to select a tenths value, and this has the effect through energization of magnet R552 of picking up an extra column shift magnet R141 and effecting the column shift circuits. In cycles 9 and 10, the LH and RH components are entered together with the second quotient digit.

The cycle 11 test selects a quotient digit of 1 and in this case the circuits are adjusted under control of the R1 magnet to skip the LH entry (since there is no LH component) and enter the RH (which is the divisor) in the next cycle 12.

Cycle 13 results in another tenths selection followed by LH and RH entry in cycles 14 and 15.

In cycle 16, the 0 or 9 test of the dividend accumulator orders has resulted in energizing an additional magnet (R593), so that in turn additional magnets R141 are energized to signal the limit of computation as set up by the initial plug connection 103 and accordingly magnet R602 is picked up, terminating the operations.

LAST ACCUMULATOR ORDER TEST

In cases where the last quotient digit is entered into the last or units order of the quotient accumulator and the following test results in the selection of an "imaginary" .9 quotient digit for the next step, the machine will automatically increase the units quotient digit by 1.

The manner in which this is carried out will now be set forth and explained in connection with Fig. 19, wherein the sequence of operations is given. It will be assumed that the plug connection 103 of Fig. 14a is made so that the last quotient digit is entered in the units order, and this would occur in a cycle corresponding to cycle 15 of Fig. 15d. At the end of such cycle, the quotient would appear as thus far computed in the quotient accumulator, and there may be a remainder standing in the dividend accumulator so that on the fo'lowing cycle corresponding to cycle 16 of Fig. 15d the operations will repeat as already explained, i. e., magnet R607 will again pick up and hold as well as magnet R518 and the magnets R546, R549, R500, R501, R502 and R503. The number of 9's standing in the dividend accumulator will, of course, determine the exact number of these magnets to be energized.

Thereafter, one of the magnets R906 will be energized in accordance with the value of the second highest dividend digit, and then when magnet R512 is energized circuits are completed under control of the highest dividend digit to energize magnet R9 through the .9 wire 152 of Fig. 14k. If the quotient magnet selection had been any other than R9, operations at this point would have proceeded as explained in connection with cycle 16 to stop the machine at the end of this cycle. In this special case, where the test indicates that the next quotient position, which is termed imaginary inasmuch as it lies beyond the capacity of the accumulator, is .9, the tenths relay magnet R552 is also energized and held along with magnet R9 so that in Fig. 14b, when contacts C207 close to set up the column shift magnets R141, the entire group numbered 1 to 10 will be picked up and held for the short duration of closure of contacts C207.

Concurrently with the time of opening of contacts C207, contacts C166 (Fig. 14a) close to complete a circuit from line 101, z contacts of magnet R596, contacts C166, wire 126, b contacts of the 10 magnet R141 (shifted), e contacts of magnet R560, d contacts of magnet R590, e contacts of magnet R9 (shifted), magnet R556 to line. This magnet closes a pair of c contacts to provide a holding circuit through a second winding thereof and contacts C206. It also opens a pair of a contacts at the top of Fig. 14m through which the holding circuits for the R141, R9 and R552 magnets extend, so that these magnets are not held energized as during previous operations but will drop out as indicated in Fig. 19.

Thereafter, contacts C59 (Fig. 14m) close and a circuit is completed from line 101, through contacts C59b, d contacts of magnet R556 to magnet R1 which will now be energized for the period indicated. At the same time, another pair of contacts C59a closing in Fig. 14b will complete a circuit through b contacts of magnet R556 to energize the R141 magnets numbered 1 to 9, it being noted that at this time magnet R552 is de-energized so that the 10 magnet R141 is not re-energized. The holding circuit for magnet R1 (Fig. 14m) extends through wire 154 (Fig. 14m), contacts C231, contacts C220, and b contacts of magnet R596. Before contacts C220 make, magnet R556 will have become deenergized, so that its a contacts reclose and the holding circuit then extends from the wire 154, through contacts C231, a contacts of magnet R556 and from there through the b contacts of magnet R596 to line. This circuit will hold until contacts C231 break.

Now, when contacts C202 (Fig. 14m) close, a circuit is traceable from line 101, contacts C202, c contacts of magnet R596, b contacts of magnet R602, b contacts of magnet R607 (shifted), d contacts of magnet R1 (shifted), to magnet R597 and line. As a result, as previously explained, drum clutch magnet 30 is picked up, the drum and contact shift magnets are selectively energized as well as magnets R190, R412, R367, R214 so that during the next cycle operations take place and add a 1 in the units order of the quotient accumulator and 1 times the divisor is subtracted from the dividend. When contacts C205 (Fig. 14n) close, magnet R558 will be energized through the e contacts of magnet R556 and the holding circuit will extend through its e contacts and the b contacts of magnet R596.

In cycle 18, when contacts C191 (Fig. 14a) close, a circuit is completed through the a contacts of magnet R558, and the d contacts of magnet R607 to energize magnet R602 which will hold through contacts C190 and cause termination of computing operations at the end of the cycle, as already explained. During cycle 18 as before, the magnets R607, R518, etc., pick up as indicated in Fig. 19 and near the end of cycle 17, after the entering portion thereof, contacts C196 (Fig. 14g) close to test the highest order of the dividend accumulator for an overdraft condition. If none is found, the operation as represented in full lines for cycle 18 take place.

If the entering operation resulted in an overdraft, magnets R593 and R587 will be energized to also bring about the operation indicated by dotted lines in cycle 18, which will result in operation as explained for cycle 7 (Fig. 15b), so that the divisor is added to the dividend accumulator and a 1 is subtracted from the lowest order in the quotient accumulator, leaving these as they were in cycle 15. Thus, for a non-overdraft condition, cycle 18 takes place without entering operations, and for an overdraft condition the entering operations take place with all operations in either event terminating at the end of cycle 18.

ZERO DIVISION CONDITION

In Fig. 14e, the relay magnet R555 is provided and is energized as explained when all divisor setup orders contain 9's, i. e. the divisor is zero. For such special case, magnet R555 closes its b contacts in Fig. 14a to directly energize magnet R602 when contacts C191 close in the second cycle, so that operations do not proceed further.

Figs. 9 and 9a illustrate conditions wherein the last quotient digit to be obtained falls in the last or right hand order of the quotient accumulator. In these diagrams, simple examples are selected and the operations are believed self-explanatory. In Fig. 9, after the initial ½ divisor entry, the comparison of dividend and divisor highest orders results in selection of magnet R7 and multiplication by 7 with entry of a 7 into the quotient accumulator. The net comparison of 58 and 12 results in selection of R4, subtraction of 48 and entry of a 4. Finally, comparison of the remainder 10 with 12 results in selection of R8 (see table Fig. 17), so that operations terminate as explained for cycle 16 of Fig. 15d with the rounded result of 74.

In Fig. 9a, operations are similar up to the point where remainder 12 is obtained and 75 stands in the quotient accumulator. At such time the remainder 12 is compared with the divisor 12 (Fig. 17) to select R9 and R552 and the result of this selection adds a 1 in the units order of the quotient to raise it to 6.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a dividing machine, an accumulator settable to represent a dividend, a device settable to represent a divisor, a quotient place limiting device selectively settable in accordance with the number of quotient digits to be computed, dividend magnitude determining means, divisor magnitude determining means, means controlled by the divisor settable device for obtaining and entering one-half the divisor into the dividend accumulator and column shift mechanism jointly controlled by both said determining means and by said quotient place limiting device, for directing the half divisor entry into said accumu- 2,536,906

35 lator in appropriate denominational relationship for obtaining a rounded quotient to the selected number of quotient digits.

2. In a dividing machine, an accumulator having ordered elements, a settable device having similarly ordered elements, the elements of both the accumulator and the device being settable to represent, respectively, a dividend and a divisor, a quotient place limiting device selectively settable in accordance with the number of quotient digits to be computed, dividend magnitude determining means, divisor magnitude determining means, means controlled by the divisor settable device for obtaining and entering five times the divisor into the dividend accumulator and column shift mechanism jointly controlled by both said determining means and by said quotient place limiting device for directing the five times entry into said accumulator in varying denominational allocation.

3. In combination with an accumulator having ten denominationally ordered elements settable to represent an amount, means for testing the settings of said elements to ascertain the denominational magnitude of the set amount, comprising a magnet energized under control of said elements when the number of elements to the left of the element containing the highest significant digit of the amount is five or more, and a set of five magnets energized under control of said elements and corresponding in number to the number of elements to the left of the said highest digit exceeding five or corresponding in number to the number of elements to the left of said highest digit from one to four.

4. In a cyclically operable dividing machine, an accumulator settable to represent a dividend, a receiving device settable to represent a divisor, a multiplying mechanism controlled by said divisor device for forming the left hand partial product components of 5 times the divisor and entering the same in said accumulator, means controlled by the divisor device for directly entering the right hand partial product components of 5 times the divisor into said accumulator, and column shift means controlled by the dividend and divisor devices jointly, for directing said component entries in appropriate denominational relationship.

5. The invention set forth in claim 4 in which the dividend and divisor are set up in the form of 9's complements, and control devices are provided to cause the components to be entered into the accumulator in the form of 9's complements.

6. The invention set forth in claim 4 in which the means controlled by the divisor device includes a device for causing each order of the divisor device containing an odd digit of the true divisor to control the entry of a 5 into the related order of the accumulator.

7. In a cyclically operable machine, an accumulator of the differentially operable type in which an amount may be entered in a single cycle of operation, said cycle comprising an entering period followed by a tens carry period, entering means therefor, an entry receiving device settable to represent a multidenominational amount, means controlled thereby for forming the left and right hand components of the partial products of said amount times 5, and control devices for causing the last named means to control the accumulator entering means to enter the formed left and right hand components of 5 times said amount into the accumulator in succession during said entering period of the cycle and prior to the tens carry period.

36

8. In a dividing machine, an accumulator settable to represent a dividend, a receiving device settable to represent a divisor, means controlled by said divisor representing device for obtaining and entering 5 times the divisor into said accumulator, column shift mechanism for directing the entry into the accumulator in accordance with the magnitudes of the factors, comparing means for comparing a number represented by the highest orders of the divisor with a like number represented by the highest orders of the dividend, and means controlled thereby if the said compared divisor orders are equal in value to the dividend orders, for causing the column shift mechanism to enter the said 5 times the divisor with a columnar shift to the right.

9. In a dividing machine, an accumulator settable to represent a dividend, a receiving device settable to represent a divisor, means controlled by said divisor representing device for obtaining and entering 5 times the divisor into said accumulator, column shift mechanism for directing the entry into the accumulator in accordance with the magnitudes of the factors, comparing means for comparing a number represented by the highest orders of the divisor with a like number represented by the highest orders of the dividend, and means controlled thereby if the said compared orders of the divisor are greater in value than the dividend orders, for causing the column shift mechanism to enter the said 5 times the divisor with a columnar shift to the right.

10. In a dividing machine, having a dividend receiving device, and a divisor receiving device, said devices being settable to represent multidenominational factors, the combination of a trial quotient digit selecting mechanism comprising a set of quotient digit magnets, one for each of the digits 1 to 9, a tenths magnet, a circuit network for selectively energizing said magnets, means for sending an impulse through the network, means controlled in accordance with the two highest orders of the divisor for effecting an initial adjustment of said network, means controlled in accordance with the two highest orders of the dividend for directing said impulse through the adjusted network to energize the one of said digit magnets representing 9 and also said tenths magnet, when the said pairs of highest orders are equal in value.

11. In a dividing machine, having a dividend receiving device, and a divisor receiving device, said devices being settable to represent multidenominational factors, the combination of a trial quotient digit selecting mechanism comprising a set of quotient digit magnets, one for each of the digits 1 to 9, a tenths magnet, a circuit network for selectively energizing said magnets, means for sending an impulse through the network, means controlled in accordance with the two highest orders of the divisor for effecting an initial adjustment of said network, means controlled in accordance with the two highest orders of the dividend for directing said impulse through the adjusted network to energize the one of said digit magnets representing a trial quotient digit which is either correct, a unit too low or a unit too high of the value of the pair of divisor orders and ten times the value of the pair of dividend orders, and also said tenths magnet, when the pair of divisor orders is greater in value than the pair of dividend orders.

12. A quotient digit selecting device for a dividing machine, comprising a series of magnets representing the values 10, 11, 12, 13, 14, 16, 18, 20, 22, 25, 28, 31, 34, 38, 42, 47, 52, 58, 65, 72, 80, 89 and 99 upon which a two-place divisor is settable by energization of the magnet corresponding to said divisor or the magnet next higher in value, a set of contacts operated by each magnet, each set including a pair of contacts for each of said series of values, means for sending a current impulse to all contacts of like value corresponding to a two-place dividend or the contacts next higher in value, a set of quotient digit representing magnets, and connections extending from said contacts so arranged as to direct the current impulse to the digit magnet representing the quotient digit which is correct or a unit too high or low.

13. In a dividing machine having an accumulator settable to represesnt a dividend, an entry receiving device settable to represent a divisor, a quotient receiving device, and control mechanism for reducing the dividend by the divisor or multiples thereof for each quotient digit and for obtaining the quotient digits in the quotient receiving device, in combination with means settable in accordance with the number of quotient places to be computed, means for entering one-half the divisor into said accumulator to increase the dividend by such amount, means jointly controlled by the accumulator, the entry receiving device and the settable means for adjusting the denominational allocation of said amount and further control means effective to cause said increase and reduction of the dividend to occur in succession.

14. A trial quotient selecting device for a dividing machine comprising, a pair of elements settable to represent a two-place dividend, a pair of elements settable to represent a two-place divisor, a series of magnets having different two-place values ranging from 10 to 99, the number of said magnets being less than the total possible number of two-place values, means controlled by the divisor elements for causing energization of a magnet having the divisor value or the magnet having the nearest higher value in the series, a series of quotient digit magnets one for each of the digits 1 to 9, a current impulse source, circuit connections partially established by each selected one of said first set of magnets between said source and all of said quotient digit magnets, and means controlled by said dividend elements for selectively completing one of said partially established circuits, the connections being so arranged that the quotient digit magnet energized by the current impulse will represent exactly or within one unit the true quotient of the dividend and divisor set up on said pairs of elements, when the divisor is less in value than the dividend.

15. A trial quotient selecting device for a dividing machine comprising, a pair of elements settable to reprsent a two-place dividend, a pair of elements settable to represent a two-place divisor, a series of magnets having different two-place values ranging from 10 to 99, the number of said magnets being less than the total possible number of two-place values, means controlled by the divisor elements for causing energization of a magnet having the divisor value or the magnet having the nearest higher value in the series, a series of quotient digit magnets one for each of the digits 1 to 9, a current impulse source, circuit connections partially established by each selected one of said first set of magnets between said source and all of said quotient digit magnets, and means controlled by said dividend elements for selectively completing one of said partially established circuits, the connections being so arranged that the quotient digit magnet energized by the current impulse will represent exactly or within one unit the true quotient of ten times the dividend and the divisor set up on said pair of elements, when the divisor is greater in value than the dividend.

16. A trial quotient selecting device for a dividing machine comprising, a pair of elements settable to represent a two-place dividend, a pair of elements settable to represent a two-place divisor, a series of magnets having different two-place values ranging from 10 to 99, the number of said magnets being less than the total possible number of two-place values, means controlled by the divisor elements for causing energization of a magnet having the divisor value or the magnet having the nearest higher value in the series, a series of quotient digit magnets one for each of the digits 1 to 9, a current impulse source, circuit connections partially established by each selected one of said first set of magnets between said source and all of said quotient digit magnets, and means controlled by said dividend elements for selectively completing one of said partially established circuits, the connections being so arranged that the quotient digit magnet energized by the current impulse will represent the digit 9 when the divisor and dividend set up on said pairs of elements are of equal value.

17. A trial quotient digit selecting device for a dividing machine, comprising a pair of elements settable to represent a two-place dividend, an element settable to represent a single place divisor, a series of magnets having different two-place values ranging from 10 to 99, the number of said magnets being less than the total possible number of two-place values, means controlled by the divisor element for causing energization of a magnet having ten times the divisor value or the magnet being the nearest higher value in the series, a series of quotient digit magnets one for each of the digits 1 to 9, a current impulse source, circuit connections partially established by each selected one of said first set of magnets between said source and all of said quotient digit magnets, and means controlled by said dividend elements for selectively complete one of said partially established circuits, the connections being so arranged that the quotient digit magnet energized by the current impulse will represent exactly or within one unit the true quotient of the dividend and divisor set up on said elements when the dividend is not more than ten times the divisor or will represent exactly or within one unit the true quotient of the higher place digit of the dividend and divisor set up on said elements when the dividend is more than ten times the divisor.

18. In combination with an accumulator having a predetermined number of denominationally ordered elements settable to represent an amount, means for testing the settings of said elements to ascertain the denominational magnitude of the set amount, comprising a magnet energized under control of said elements when the number of elements to the left of the element containing the highest significant digit of the amount is a predetermined number or more, and a plurality of further magnets energized under control of said elements corresponding in number to the number of elements to the left of said highest digit exceeding the said predetermined number or correeding in number to the number of elements to the left of said highest digit from one to one less than said predetermined number.

SAMUEL BRAND.
JAMES M. CUNNINGHAM.

REFERENCES CITED

The following references are of record in the file of this patent:

UNITED STATES PATENTS

| Number | Name | Date |
|---|---|---|
| 1,813,830 | Weiner | July 7, 1931 |
| 2,228,330 | Torkelson | Jan. 14, 1941 |
| 2,264,622 | Dickinson | Dec. 2, 1941 |
| 2,343,273 | Avery | Mar. 7, 1944 |
| 2,350,499 | Dickinson | June 6, 1944 |
| 2,359,631 | Dickinson | Oct. 3, 1944 |
| 2,467,419 | Avery | Apr. 19, 1949 |

FOREIGN PATENTS

| Number | Country | Date |
|---|---|---|
| 115,345 | Australia | June 12, 1942 |